(12) United States Patent
Yoshida et al.

(10) Patent No.: US 8,405,335 B2
(45) Date of Patent: Mar. 26, 2013

(54) ROTARY ELECTRIC MACHINE CONTROL SYSTEM

(75) Inventors: Takashi Yoshida, Anjo (JP); Subrata Saha, Anjo (JP); Daisuke Ogino, Anjo (JP); Jin Izawa, Obu (JP)

(73) Assignee: Aisin AW Co., Ltd., Anjo (JP)

( * ) Notice: Subject to any disclaimer, the term of this patent is extended or adjusted under 35 U.S.C. 154(b) by 361 days.

(21) Appl. No.: 12/733,367

(22) PCT Filed: Dec. 1, 2008

(86) PCT No.: PCT/JP2008/071800
§ 371 (c)(1),
(2), (4) Date: Feb. 25, 2010

(87) PCT Pub. No.: WO2009/084359
PCT Pub. Date: Jul. 9, 2009

(65) Prior Publication Data
US 2010/0201293 A1 Aug. 12, 2010

(30) Foreign Application Priority Data
Dec. 28, 2007 (JP) ................................. 2007-339611

(51) Int. Cl.
*H02P 7/00* (2006.01)
*H02P 6/10* (2006.01)

(52) U.S. Cl. .................. 318/432; 318/139; 318/400.23; 180/65.3

(58) Field of Classification Search .................. 318/139, 318/254, 439, 400.23, 376, 432; 307/9.1, 307/10.1; 180/652, 197, 65.265, 65.3; 701/28; 477/3
See application file for complete search history.

(56) References Cited

U.S. PATENT DOCUMENTS

| | | | | |
|---|---|---|---|---|
| 5,367,455 A * | 11/1994 | Kitagawa et al. | ............... | 701/22 |
| 5,808,428 A * | 9/1998 | Ito et al. | ......................... | 318/139 |
| 8,002,057 B2 * | 8/2011 | Tanaka et al. | ............ | 180/65.265 |
| 8,112,192 B2 * | 2/2012 | Heap et al. | ....................... | 701/22 |
| 2002/0147530 A1 * | 10/2002 | Tamagawa et al. | ............. | 701/22 |
| 2004/0145338 A1 | 7/2004 | Nakamura et al. | | |

(Continued)

FOREIGN PATENT DOCUMENTS

| | | |
|---|---|---|
| JP | A 2005-170086 | 6/2005 |
| JP | A 2006-187100 | 7/2006 |

(Continued)

OTHER PUBLICATIONS

International Search Report for International Application No. PCT/JP2008/071800, issued Mar. 3, 2009.

(Continued)

*Primary Examiner* — Paul Ip
(74) *Attorney, Agent, or Firm* — Oliff & Berridge, PLC

(57) ABSTRACT

A rotary electric machine control system includes a battery electric power calculation unit for calculating battery electric power that is supplied from the battery; a torque limitation unit for limiting an output torque of the rotary electric machine; and a battery electric power abrupt variation estimation unit for estimating that the battery electric power is in an abrupt variation state in which the battery electric power is varying abruptly on the basis of at least one of a variation rate of the battery electric power and a variation rate of a rotational speed of the rotary electric machine.

14 Claims, 12 Drawing Sheets

U.S. PATENT DOCUMENTS

| | | | |
|---|---|---|---|
| 2005/0241868 A1* | 11/2005 | Hommi et al. | 180/197 |
| 2007/0216312 A1* | 9/2007 | Ogata et al. | 315/131 |
| 2008/0265809 A1* | 10/2008 | OI et al. | 318/139 |
| 2008/0283313 A1* | 11/2008 | Ojima et al. | 180/65.3 |
| 2008/0289889 A1* | 11/2008 | Hashimoto | 180/65.2 |
| 2009/0118080 A1* | 5/2009 | Heap et al. | 477/3 |
| 2009/0163317 A1* | 6/2009 | Goda et al. | 477/3 |
| 2009/0236160 A1* | 9/2009 | Tanaka et al. | 180/65.265 |
| 2009/0243523 A1* | 10/2009 | Tanaka et al. | 318/376 |
| 2010/0201293 A1* | 8/2010 | Yoshida et al. | 318/139 |
| 2010/0207559 A1* | 8/2010 | Imai | 318/400.23 |

FOREIGN PATENT DOCUMENTS

| | | |
|---|---|---|
| JP | A-2006-262638 | 9/2006 |
| JP | A 2007-99081 | 4/2007 |
| JP | A-2007-290483 | 11/2007 |
| WO | WO 03/056694 A1 | 7/2003 |

OTHER PUBLICATIONS

Mar. 3, 2009 International Search Report issued in International Application No. PCT/JP2008/071797 (with English Translation).

* cited by examiner

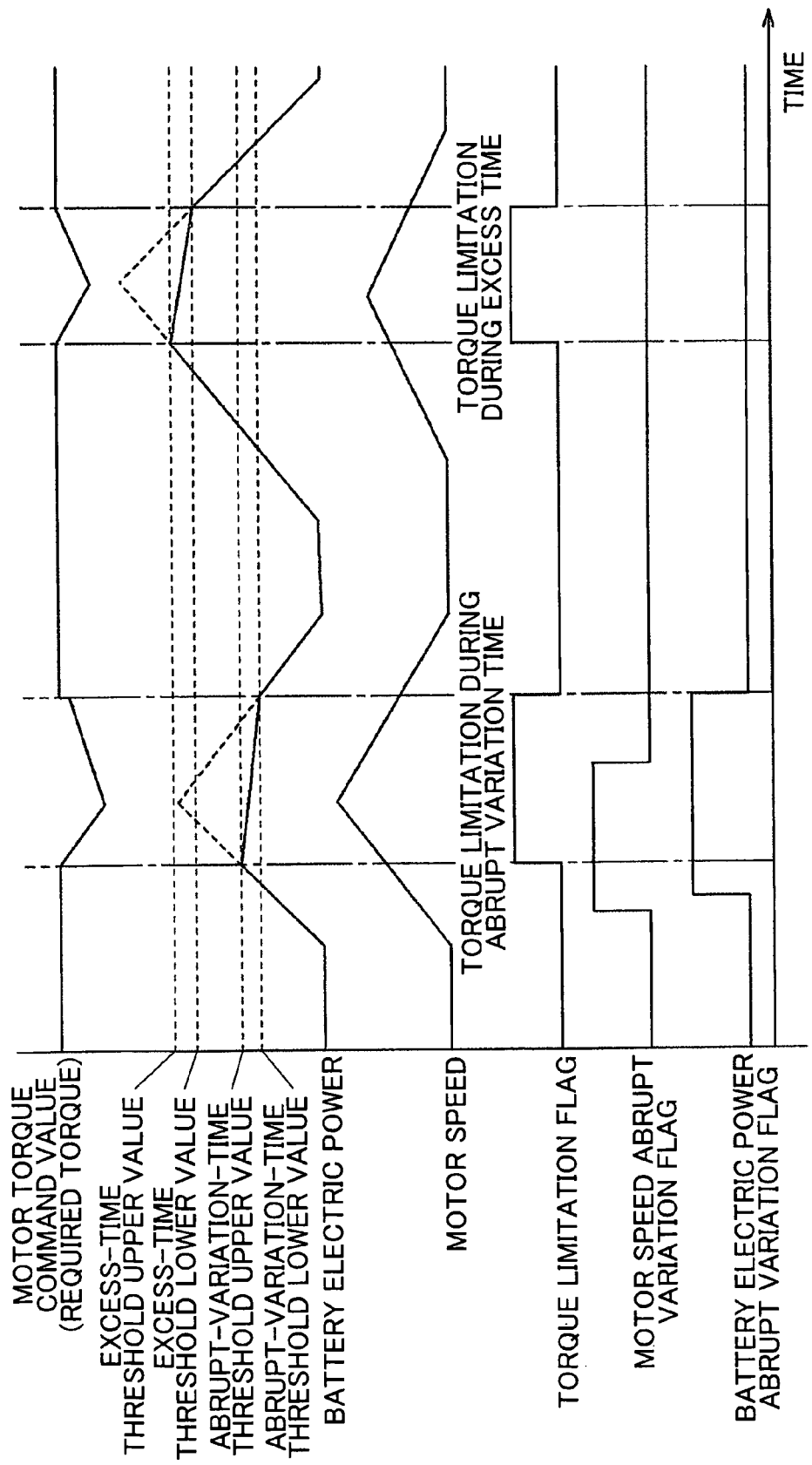

ROTARY ELECTRIC MACHINE CONTROL SYSTEM

INCORPORATION BY REFERENCE

This application is the U.S. National Phase of PCT/JP2008/071800 filed on Dec. 1, 2008, which claims priority from Japanese Patent Application No. JP 2007-339611 filed on Dec. 28, 2007, the specification, drawings and abstract of which are incorporated herein by reference in their entirety.

BACKGROUND

The present invention relates to a rotary electric machine control system including a rotary electric machine and an inverter interposed between a battery and the rotary electric machine to control a current that flows through the rotary electric machine.

WO2003/056694 discloses an electrical load apparatus 100 including a battery B, an AC motor M1 serving as a rotary electric machine, and an inverter 14 interposed between the battery and the rotary electric machine to control a current that flows through the rotary electric machine.

In the electrical load apparatus 100, when the amount of increase (equivalent to the "variation rate" in the present application) in power consumed by the AC motor M1 (equivalent to the "battery electric power" in the present application) exceeds allowable power that can be supplied from a capacitance 13 to the inverter 14, a control device 30 limits the amount of increase in power consumed by the AC motor M1 to a range in which continuous driving of the electrical load apparatus 100 is allowed.

The technique disclosed in WO2003/056694 is related to a vehicle or the like that runs on a drive force produced by the AC motor M1, and is intended to protect the inverter by limiting the amount of increase in consumed power to a predetermined range.

Nowadays, hybrid systems including an engine and a rotary electric machine serving as a motor as drive sources to obtain a drive force for running from one or both of the engine and the rotary electric machine are in practical use. As one type of hybrid system, a so-called split hybrid system is provided which includes an engine and a pair of rotary electric machines, and in which a drive force output from the engine is distributed to wheels and a first one of the rotary electric machines to cause the first rotary electric machine to generate electricity while a second rotary electric machine supplements the engine drive force to be transmitted to the wheels. In the system, the engine is operated in accordance with an optimum fuel efficiency line to allow the vehicle to run at a very high fuel efficiency. In the system, the second rotary electric machine mainly serves as a motor.

In this type of hybrid system, a rotary electric machine which mainly produces a torque for driving the wheels (the second rotary electric machine which serves as a motor described earlier) and a rotary electric machine which mainly controls the rotational speed of the engine (the first rotary electric machine which serves as a generator described earlier) are connected in parallel to a single battery via an inverter. The rotary electric machines are controlled such that the sum of electric power consumed by the rotary electric machine serving as a motor and electric power consumed by the rotary electric machine serving as a generator will not exceed the discharge electric power limit of the battery.

SUMMARY

In the case where control based on only the amount of increase in consumed power is executed as described above, the torque of the rotary electric machine serving as a motor is limited if the amount of increase, that is, the amount of variation, in consumed power is large. This may cause torque limitation to be performed even in the case where the torque itself is small and thus does not need to be limited, as a result of which a drive force that would normally be obtained may not be obtained.

In the case where the absolute amount of consumed power is large but the amount of variation in consumed power is small, no torque limitation is performed, as a result of which the battery itself or a circuit from the battery to the inverter may be damaged by an over-current.

Further, in the case of a system including a rotary electric machine serving as a motor and a rotary electric machine serving as a generator, for example, the motor and the generator are controlled such that the sum of outputs of the motor and the generator will not exceed the discharge electric power limit of the battery. However, the rotary electric machine serving as a motor is controlled by torque control, and therefore in the case where the load torque of the motor abruptly decreases, for example when the wheels slip or spin, the rotational speed of the motor increases abruptly. Therefore, electric power is drawn abruptly from the battery to cause a large current to pass through an element between the battery and the motor, which may cause an over-current. In this circumstance, the battery discharges electric power exceeding its discharge electric power limit, and therefore the life of the battery may be reduced.

In the split hybrid system described earlier, an increase in rotational speed of the rotary electric machine serving as a motor decreases the rotational speed of the rotary electric machine serving as a generator. This decreases regenerative power generated by the rotary electric machine serving as a generator, which further increases the electric power drawn from the battery.

An object of the present application is to provide a rotary electric machine control system for a rotary electric machine that is supplied with electric power from a battery via an inverter to serve as a motor, in which a circuit from the battery to the inverter is reliably protected by preventing an over-current.

Another object is to provide a rotary electric machine control system for a hybrid system including a pair of rotary electric machines that are supplied with electric power from a common battery to respectively serve as a generator and a motor, in which a circuit from the battery to the inverter is reliably protected by preventing an over-current.

In order to achieve the foregoing objects, the present invention provides a rotary electric machine control system including a rotary electric machine and an inverter interposed between a battery and the rotary electric machine to control a current that flows through the rotary electric machine, including:

battery electric power calculation unit for calculating battery electric power that is required to be supplied from the battery;

torque limitation unit for limiting an output torque of the rotary electric machine; and battery electric power abrupt variation estimation unit for estimating that the battery electric power is in an abrupt variation state in which the battery electric power is varying abruptly on the basis of at least one of a variation rate of the battery electric power and a variation rate of a rotational speed of the rotary electric machine, in which the torque limitation unit changes, in the case where the battery electric power abrupt variation estimation unit estimates that the battery electric power is in the abrupt variation state, a mode of limitation of the output torque from a mode of limitation of the output torque used in a non-abrupt variation state in which the battery electric power is not varying abruptly.

According to the thus configured rotary electric machine control system, the battery electric power calculation unit derives battery electric power that is supplied from the battery when the rotary electric machine operates in accordance with a rotational speed and an output torque, and the battery electric power abrupt variation estimation unit estimates that the battery electric power is in an abrupt variation state in which the battery electric power is varying abruptly on the basis of at least one of a variation rate of the battery electric power and a variation rate of the rotational speed of the rotary electric machine.

In the present application, a state in which the battery electric power is varying abruptly is referred to as an "abrupt variation state", and a state in which the battery electric power is not varying abruptly is referred to as a "non-abrupt variation state". The mode of limitation of the output torque used by the torque limitation unit is changed depending on whether the battery electric power is in the abrupt variation state or in the non-abrupt variation state.

That is, according to the present application, not only normal torque limitation is performed during a non-abrupt variation time, but also the battery electric power abrupt variation estimation unit is provided to determine whether the battery electric power is in the abrupt variation state or in the non-abrupt variation state and to employ a mode of limitation of the output torque in accordance with the state of the battery electric power. This allows execution of torque limitation matching the operating state. It is important what timing to execute limitation of the output torque. In this respect, it is possible to take adequate measures in accordance with the vehicle state.

Preferably, in changing the mode of limitation of the output torque, the torque limitation unit executes torque limitation in the non-abrupt variation state in which the battery electric power is not varying abruptly and during an excess time when the battery electric power calculated by the battery electric power calculation unit is higher than an excess-time threshold for determining whether or not the battery electric power is excessive, and the torque limitation unit executes torque limitation in the abrupt variation state in which the battery electric power is varying abruptly and during an abrupt variation time when the battery electric power is higher than an abrupt-variation-time threshold that is smaller than the excess-time threshold.

In the case where this configuration is employed, the necessity of torque limitation is determined with reference to the excess-time threshold in the normal non-abrupt variation state, and with reference to the abrupt-variation-time threshold which is smaller than the excess-time threshold during an abrupt variation time. Thus, it is determined that the electric power which is supplied from the battery reaches its limit with reference to a relatively large threshold in a state in which the torque or the rotational speed is increasing gradually and the battery electric power is increasing gradually, and with reference to a relatively small threshold in a state in which the torque or the rotational speed is varying abruptly and the battery electric power is varying abruptly. This reliably prevents an over-current from flowing through the battery and an inverter circuit.

According to the present application, focus is given to an excess time when the magnitude of the battery electric power is excessive and an abrupt variation time when the battery electric power is varying abruptly with the magnitude of the battery electric power exceeding a predetermined value. The latter abrupt variation time includes a case where variations in the battery electric power itself are large and a case where the rotational speed of the rotary electric machine serving as a motor is varying abruptly (see FIG. 5). That is, the battery electric power abrupt variation estimation unit discussed above may be configured to estimate that the battery electric power is varying abruptly in the case where the battery electric power is higher than a battery electric power abrupt-variation-time threshold on the basis of which it is determined whether or not the variation rate of the battery electric power is high, or in the case where the variation rate of the rotational speed of the rotary electric machine is higher than a rotational speed abrupt-variation-time threshold on the basis of which it is determined whether or not the variation rate of the rotational speed of the rotary electric machine is high.

Such a configuration is possible because the battery electric power which is required to be supplied from the battery varies abruptly both in the case where the variation rate of the battery electric power is high and in the case where the variation rate of the rotational speed of the rotary electric machine is high.

Measures to be taken during an excess time and during an abrupt variation time according to the present application will be described below in order.

1. Measures to be Taken During Excess Time

In this case, the torque limitation unit executes torque limitation during an excess time when the battery electric power calculated by the battery electric power calculation unit is higher than the excess-time threshold for determining whether or not the battery electric power is excessive.

With this configuration, by appropriately setting the excess-time threshold, it is possible to directly prevent an over-current, for example. In addition, it is possible to avoid the problem that the battery discharges electric power exceeding its discharge electric power limit, which reduces the life of the battery.

2. Measures to be Taken During Abrupt Variation Time 2-1. Measures to be Taken on the Basis of Battery Electric Power Itself In this case, battery electric power variation rate calculation unit for calculating the variation rate of the battery electric power is provided, and the torque limitation unit executes torque limitation when the battery electric power variation rate calculated by the battery electric power variation rate calculation unit is higher than a battery electric power abrupt variation threshold for determining whether or not the battery electric power variation rate is high, and during an abrupt variation time when the battery electric power calculated by the battery electric power calculation unit is higher than the abrupt-variation-time threshold which is smaller than the excess-time threshold.

With this configuration, it is possible to determine a state that if left unaddressed may cause a problem on the basis of the relationship between the battery electric power variation rate and the battery electric power abrupt variation threshold. Further, it is possible to positively recognize occurrence of an abrupt variation state that may cause a problem and perform torque limitation by comparing the battery electric power itself with the abrupt-variation-time threshold when such a possibility occurs. Consequently, by appropriately setting the abrupt-variation-time threshold, it is possible to directly prevent occurrence of an over-current in the case where it is highly likely that an over-current occurs, for example. In addition, it is also possible to avoid the problem that the battery discharges electric power exceeding its discharge electric power limit, which reduces the life of the battery.

2-2. Measures to be Taken on the Basis of Rotational Speed of Rotary Electric Machine Serving as Motor In this case, rotational speed variation rate calculation unit for calculating the variation rate of the rotational speed of the rotary electric machine is provided, and the torque limitation unit executes torque limitation when the rotational speed variation rate calculated by the rotational speed variation rate calculation unit is higher than a rotational speed abrupt variation threshold for determining whether or not the rotational speed variation rate is high, and during an abrupt variation time when the battery electric power calculated by the battery electric power calculation unit is higher than the abrupt-variation-time threshold which is smaller than the excess-time threshold.

With this configuration, it is possible to determine a state in which the rotational speed of the rotary electric machine serving as a motor is varying abruptly and which if left unaddressed may cause a problem, on the basis of the relationship between the rotational speed variation rate and the rotational speed abrupt variation threshold. Further, it is possible to positively recognize occurrence of an abrupt variation state that may cause a problem and perform torque limitation by comparing the battery electric power with the abrupt-variation-time threshold when such a possibility occurs. Consequently, by appropriately setting the abrupt-variation-time threshold, it is possible to directly prevent occurrence of an over-current in the case where it is highly likely that an over-current occurs, for example. In addition, it is also possible to avoid the problem that the battery discharges electric power exceeding its discharge electric power limit, which reduces the life of the battery.

2-3. Measures to be Taken on the Basis of Battery Electric Power Itself or Rotational Speed of Rotary Electric Machine Serving as Motor In this case, measures are taken under any of the conditions described above in 2-1 and 2-2, in which case the system may be configured as described below:

battery electric power variation rate calculation unit for calculating the variation rate of the battery electric power is provided;

rotational speed variation rate calculation unit for calculating the variation rate of the rotational speed of the rotary electric machine is provided; and the torque limitation unit executes torque limitation when the battery electric power variation rate calculated by the battery electric power variation rate calculation unit is higher than a battery electric power abrupt variation threshold for determining whether or not the battery electric power variation rate is high, or the rotational speed variation rate calculated by the rotational speed variation rate calculation unit is higher than a rotational speed abrupt variation threshold for determining whether or not the rotational speed variation rate is high, and during an abrupt variation time when the battery electric power calculated by the battery electric power calculation unit is higher than the abrupt-variation-time threshold which is smaller than the excess-time threshold.

In the case where torque limitation is executed on the basis of the battery electric power itself or the rotational speed of the rotary electric machine of the rotary electric machine, it is possible to obtain the functions and effects respectively described above in 2-1 and 2-2.

In the configurations described above, the battery electric power calculation unit may derive the battery electric power on the basis of an actual rotational speed of the rotary electric machine and a required torque required of the rotary electric machine. In the case where a required rotational speed and a required torque, which are a rotational speed and a torque required of the rotary electric machine, are determined, the battery electric power calculation unit may derive the battery electric power on the basis of the required rotational speed and the required torque.

The rotary electric machine control system according to the present application may be applied to a vehicle drive system including a rotary electric machine serving as a motor and a hybrid system including a rotary electric machine serving as a motor and a rotary electric machine serving as a generator. Calculation of battery electric power according to the respective systems will be described below.

1. Vehicle Drive System Including Rotary Electric Machine Serving as Motor

In the vehicle drive system, only the rotary electric machine serving as a motor is to be controlled, and the battery electric power calculation unit derives the battery electric power as electric power required by the rotary electric machine to serve as a motor in the case where the rotary electric machine operates in accordance with the required rotational speed and the required torque.

By employing such a configuration for calculation, it is possible to calculate battery electric power appropriate for a running drive system including only a rotary electric machine serving as a motor.

2. Hybrid System Including Rotary Electric Machine Serving as Motor and Rotary Electric Machine Serving as Generator In the hybrid system, at least a first rotary electric machine serving as a generator and a second rotary electric machine serving as a motor are to be controlled, and the battery electric power calculation unit derives the battery electric power as the sum of electric power required by the second rotary electric machine to serve as a motor in the case where the second rotary electric machine operates in accordance with the required rotational speed and the required torque and electric power required by the first rotary electric machine to serve as a generator in the case where the first rotary electric machine operates in accordance with the required rotational speed and the required torque. By employing such a configuration for calculation, it is possible to calculate battery electric power appropriate for a hybrid system including a rotary electric machine serving as a generator and a rotary electric machine serving as a motor.

In the description above, it is not discussed how a torque limit value is set in the torque limitation. The torque limit value may be calculated and set as described below during each of an excess time and an abrupt variation time so as to reduce the torque of the rotary electric machine serving as a motor, in order to prevent an over-current and prevent drawing of excessive electric power from the battery.

1. Excess Time

The rotary electric machine control system may further include excess-time torque limit value calculation unit for calculating, in the case where the torque limitation unit executes torque limitation during the excess time, a torque limit value on the basis of excess-time limit electric power which is a maximum value of the battery electric power that is allowed during the excess time.

By calculating a torque limit value on the basis of excess-time limit electric power which is a maximum value of the battery electric power that is allowed during the excess time, and setting the torque limit value, it is possible to prevent drawing of excessive electric power from the battery and to prevent an over-current.

2. Abrupt Variation Time

The rotary electric machine control system may further include abrupt-variation-time torque limit value calculation unit for calculating, in the case where the torque limitation unit executes torque limitation during the abrupt variation time, a torque limit value on the basis of abrupt-variation-time limit electric power which is a maximum value of the battery electric power that is allowed during the abrupt variation time.

By calculating a torque limit value on the basis of abrupt-variation-time limit electric power which is a maximum value of the battery electric power that is allowed during the abrupt variation time, and setting the torque limit value, it is possible to prevent drawing of excessive electric power from the battery and to prevent an over-current even if abrupt variations occur.

In the description above, the relationship between the excess-time limit electric power and the abrupt-variation-time limit electric power is not specifically discussed. The excess-time limit electric power is used to perform torque limitation in a state in which the battery electric power is actually excessive, and the abrupt-variation-time limit electric power corresponds to a state in which it is highly likely that the battery electric power becomes excessive and that it becomes excessive abruptly. Therefore, the rotary electric machine control system may further include:

excess-time torque limit value calculation unit for calculating, in the case where the torque limitation unit executes torque limitation during the excess time, a torque limit value on the basis of excess-time limit electric power which is a maximum value of the battery electric power that is allowed during the excess time; and abrupt-variation-time torque limit value calculation unit for calculating, in the case where the torque limitation unit executes torque limitation during the abrupt variation time, a torque limit value on the basis of abrupt-variation-time limit electric power which is a maximum value of the battery electric power that is allowed during the abrupt variation time, and the excess-time limit electric power is set to be higher than the abrupt-variation-time limit electric power. Appropriate torque limitation can thus be realized.

As described earlier in relation to the battery electric power, the rotary electric machine control system according to the present application may be applied to a vehicle drive system including a rotary electric machine serving as a motor and a hybrid system including a rotary electric machine serving as a motor and a rotary electric machine serving as a generator. Calculation of a torque limit value according to the respective systems will be described below.

1. Vehicle Drive System Including Rotary Electric Machine Serving as Motor

In the vehicle drive system, only the rotary electric machine serving as a motor is to be controlled, and the torque limit value is calculated on the basis of limit electric power which is a maximum value of the battery electric power that is allowed and a motor loss required by the rotary electric machine to serve as a motor. By employing such a configuration for calculation, it is possible to calculate a torque limit value appropriate for a running drive system including only a rotary electric machine serving as a motor.

2. Hybrid System Including Rotary Electric Machine Serving as Motor and Rotary Electric Machine Serving as Generator In the hybrid system, a first rotary electric machine serving as a generator and a second rotary electric machine serving as a motor are to be controlled, and the torque limit value is calculated on the basis of limit electric power which is a maximum value of the battery electric power that is allowed, electric power required by the second rotary electric machine to serve as a motor, and electric power required by the first rotary electric machine to serve as a generator. By employing such a configuration for calculation, it is possible to calculate battery electric power appropriate for a hybrid system including a rotary electric machine serving as a generator and a rotary electric machine serving as a motor.

The excess-time threshold described earlier preferably includes an excess-time threshold upper value for use when the battery electric power is increasing and an excess-time threshold lower value for use when the battery electric power is decreasing.

With this configuration, a hysteresis is provided to the excess-time threshold. By providing a hysteresis, it is possible to compensate for a control delay, and to prevent occurrence of a problem such as hunting in the case where the battery electric power varies across the excess-time threshold in a vibrating manner.

Similarly, the abrupt-variation-time threshold described earlier preferably includes an abrupt-variation-time threshold upper value for use when the battery electric power is increasing and an abrupt-variation-time threshold lower value for use when the battery electric power is decreasing.

With this configuration, a hysteresis is provided to the abrupt-variation-time threshold. By providing a hysteresis, it is possible to compensate for a control delay, and to prevent occurrence of a problem such as hunting in the case where the battery electric power varies across the abrupt-variation-time threshold in a vibrating manner.

In order to compensate for a control delay, it is possible to derive a torque limit value described earlier using a current value and a predicted value.

That is, for a motor speed (the rotational speed of the rotary electric machine serving as a motor), the torque limit value may be calculated on the basis of a motor speed predicted value obtained as a sum of a product of a variation rate of a motor speed and a coefficient based on a control delay and a current motor speed, in order to compensate for the control delay.

Similarly, for generator electric power (the electric power of the rotary electric machine serving as a generator), the torque limit value may be calculated on the basis of a generator estimated electric power predicted value obtained as a sum of a product of a variation rate of generator electric power and a coefficient based on a control delay and current generator electric power, in order to compensate for the control delay.

BRIEF DESCRIPTION OF THE DRAWINGS

FIG. 10 shows a state of torque limitation during an abrupt variation time and during an excess time in the case where a hysteresis is provided to each of an abrupt-variation-time threshold and an excess-time threshold.

DETAILED DESCRIPTION OF THE EMBODIMENTS

A rotary electric machine control system 100 according to an embodiment of the present invention will be described below with reference to the drawings. The rotary electric machine control system 100 is incorporated in a vehicle drive system 200, the entirety of which is shown in FIG. 3, to control operation of rotary electric machines MG1 and MG2 included in the vehicle drive system 200.

Figure 1:
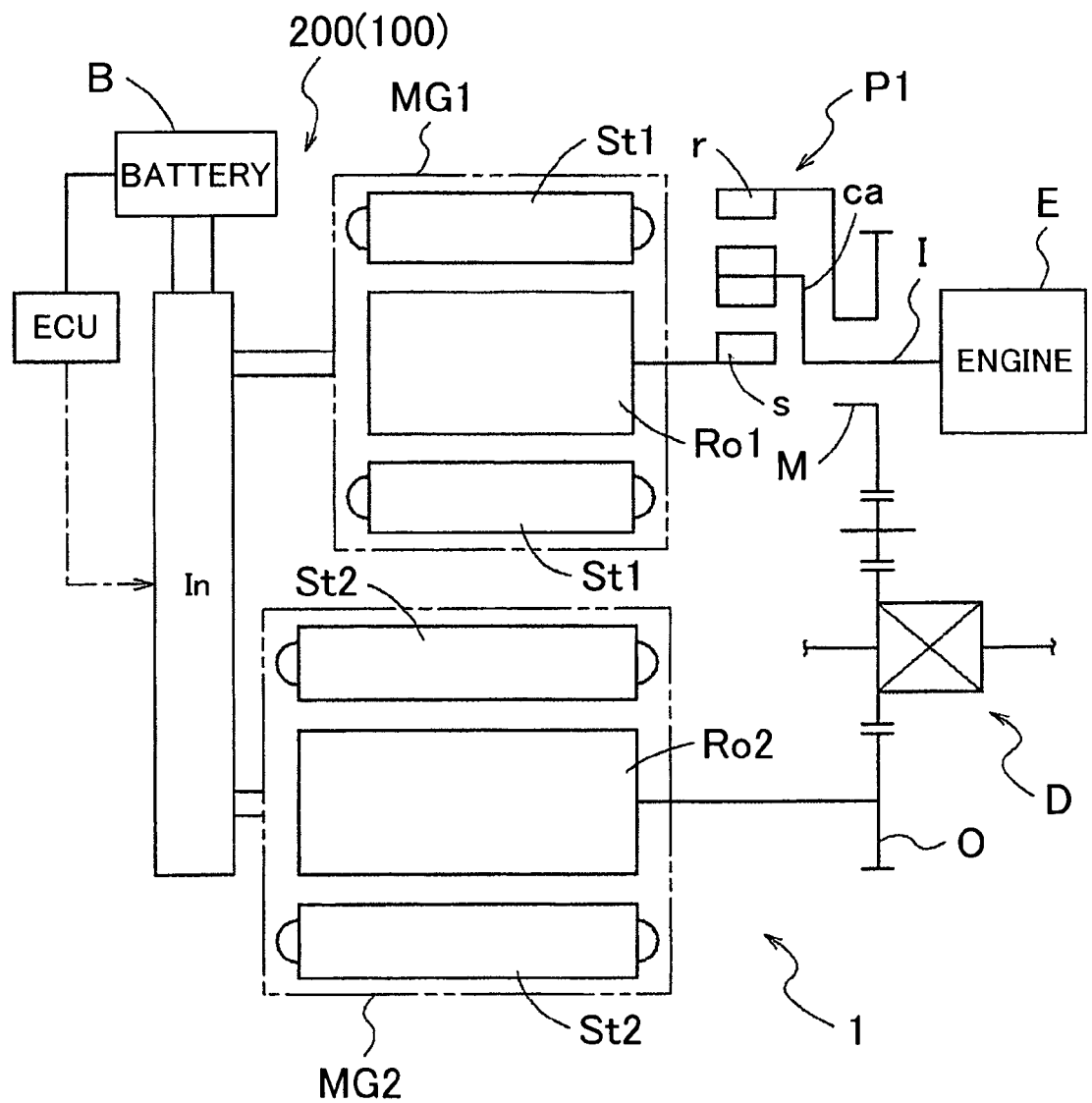
FIG. 1 schematically shows a drive system of a vehicle drive system according to the present application.
Figure 2:
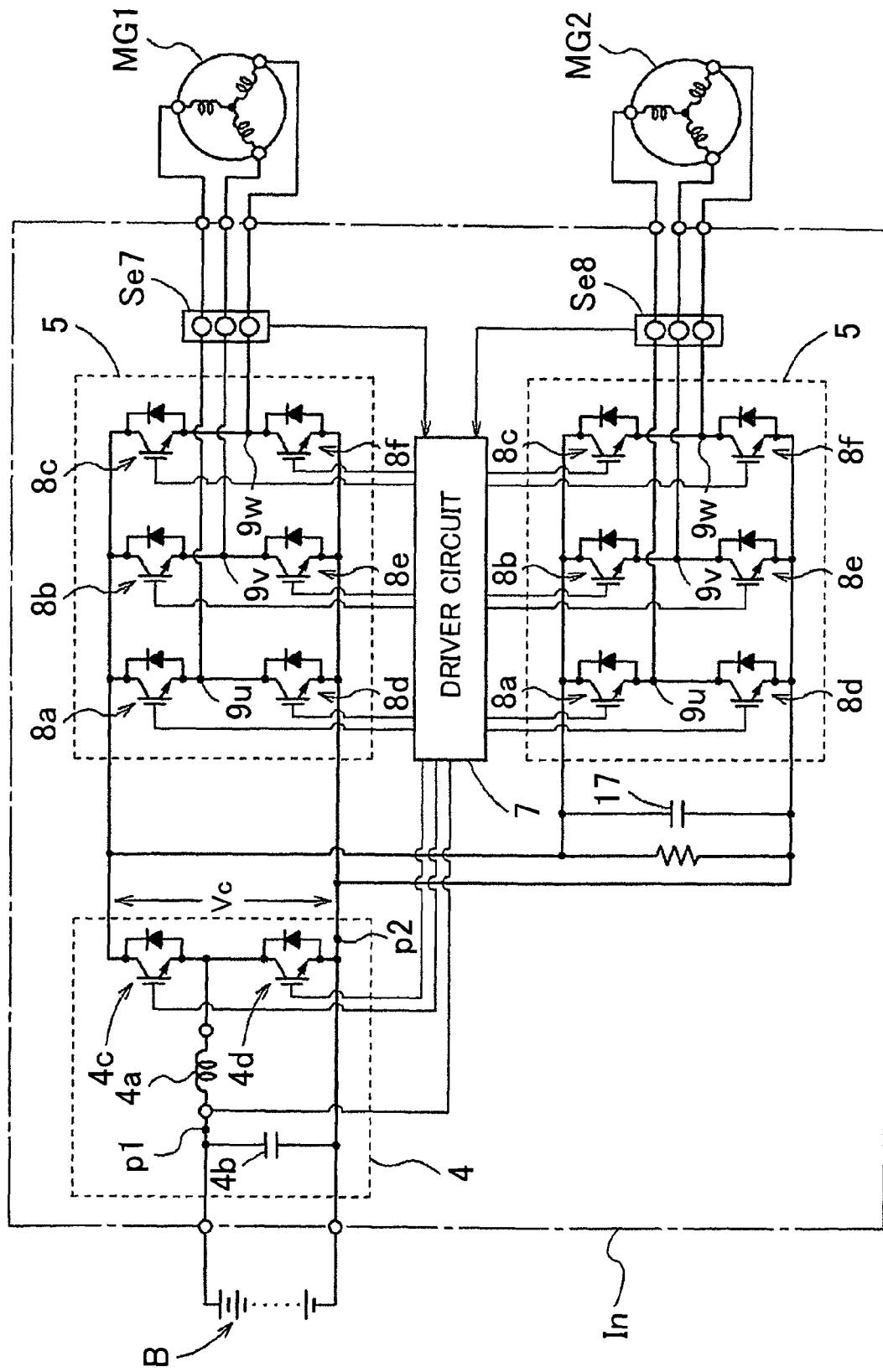
FIG. 2 schematically shows a rotary electric machine control system of the vehicle drive system according to the present application.

FIG. 1 schematically shows a drive system of the vehicle drive system 200. FIG. 2 schematically shows a rotary electric machine control system including as its main component an inverter In provided to control the rotary electric machines MG1 and MG2. FIG. 3 shows an overview of the entire vehicle drive system 200 including a control device ECU which is unique to the present application. In FIG. 3, the solid arrows indicate transfer paths for various information, the double solid lines indicate transfer paths for a drive force, and the double broken lines indicate transfer paths for electric power.

1-1. Drive System

Figure 3:
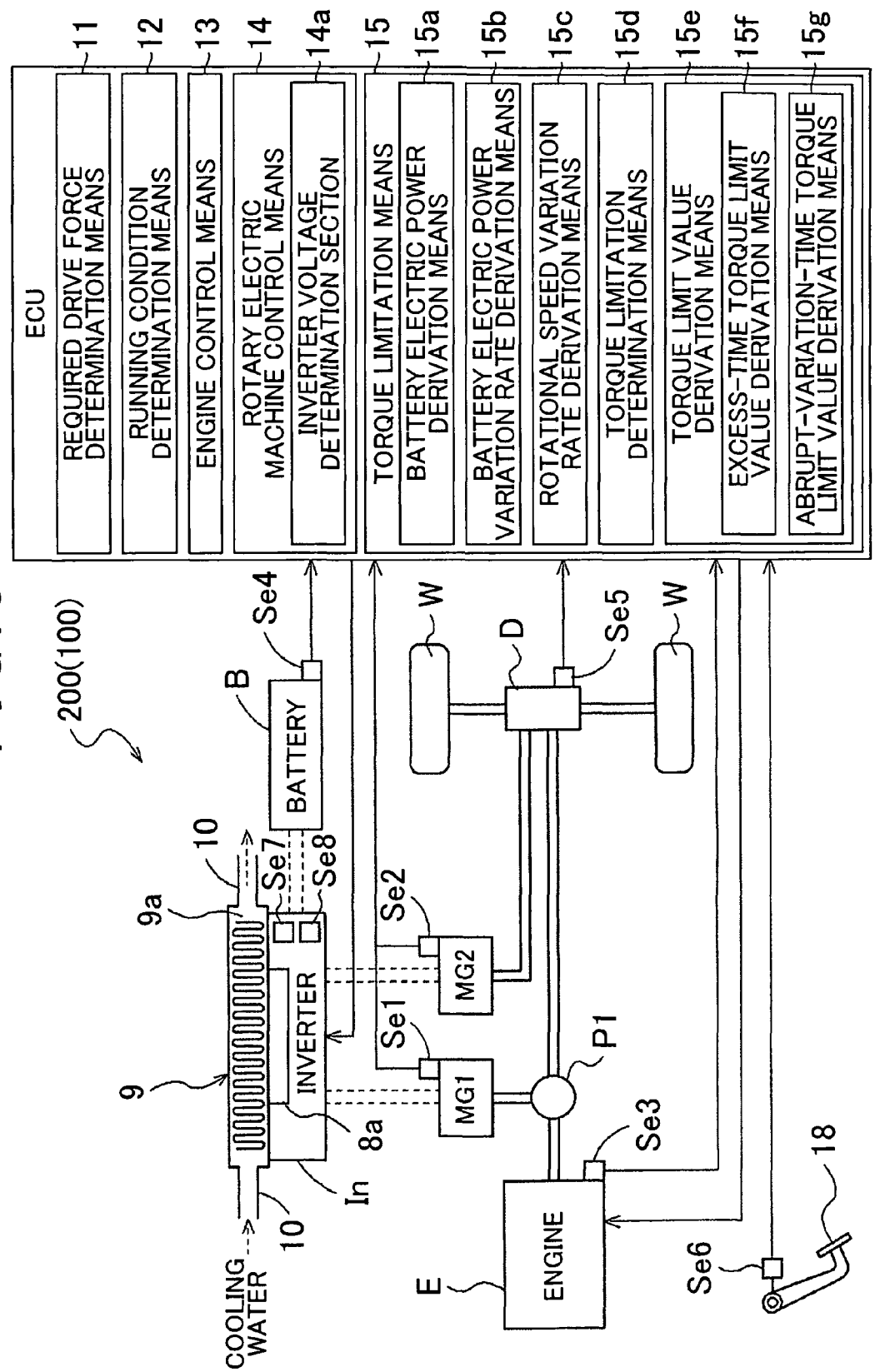
FIG. 3 schematically shows the entire vehicle drive system according to the present application.

As shown in FIGS. 1 and 3, a vehicle includes an engine E and a pair of rotary electric machines MG1 and MG2. The vehicle is configured to run by obtaining a drive force from the engine E or a rotary electric machine serving as a motor. At least a part of the drive force produced by the engine E is converted by a rotary electric machine serving as a generator into electric power, which is used to charge a battery B or to drive the rotary electric machine serving as a motor. Further, during braking, a braking force can be regenerated by the rotary electric machine into electric power, which is accumulated in the battery B.

The vehicle drive system 200 is a so-called hybrid system, and includes a hybrid drive device 1 provided between the engine E and wheels W. As the engine E, various types of known internal combustion engines such as gasoline engines and diesel engines may be used.

An input shaft I of the hybrid drive device 1 is connected to an output rotary shaft of the engine E such as a crankshaft. The input shaft I is suitably connected to the output rotary shaft of the engine E via a damper, a clutch, or the like. An output of the hybrid drive device 1 is connected via a differential device D or the like so as to transfer a rotational drive force to the wheels W. Further, the input shaft I is coupled to a carrier ca of a power distribution mechanism P1, and an intermediate shaft M connected to the wheels W via the differential device D is coupled to a ring gear r.

The first rotary electric machine MG1 includes a stator St1 and a rotor Ro1 supported radially inwardly of the stator St1 so as to be rotatable. The rotor Ro1 of the first rotary electric machine MG1 is coupled to a sun gear s of the power distribution mechanism P1 so as to be rotatable together therewith. The second rotary electric machine MG2 includes a stator St2 and a rotor Ro2 supported radially inwardly of the stator St1 so as to be rotatable. The rotor Ro2 of the second rotary electric machine MG2 is coupled to an output gear O so as to be rotatable together therewith, and connected to the input side of the differential device D. As shown in FIGS. 1 and 3, the first rotary electric machine MG1 and the second rotary electric machine MG2 are electrically connected to a battery B via the inverter In. The inverter In is structured to be cooled through heat exchange with cooling water. Each of the first rotary electric machine MG1 and the second rotary electric machine MG2 can function both as a motor that is supplied with electric power to produce motive power and as a generator that is supplied with motive power to produce electric power.

In the example, the first rotary electric machine MG1 mainly functions as a generator that is driven by a drive force input via the sun gear s of the power distribution mechanism P1 to generate electric power. Thus, the first rotary electric machine MG1 supplies electric power to charge the battery B or drive the second rotary electric machine MG2. The first rotary electric machine MG1 occasionally functions as a motor when the vehicle is running at a high speed. On the other hand, the second rotary electric machine MG2 mainly functions as a motor that supplements a drive force for running of the vehicle. The second rotary electric machine MG2 occasionally functions as a generator that regenerates an inertial force of the vehicle into electrical energy when the vehicle is decelerating or the like. The first rotary electric machine MG1 and the second rotary electric machine MG2 are operated in accordance with a control command from the control device ECU.

As shown in FIG. 1, the power distribution mechanism P1 includes a single-pinion planetary gear mechanism disposed coaxially with the input shaft I. That is, the power distribution mechanism P1 includes as its rotary elements a carrier ca that supports a plurality of pinion gears, and a sun gear s and a ring gear r that respectively mesh with the pinion gears. The sun gear s is connected to rotate together with the rotor Ro1 of the first rotary electric machine MG1. The carrier ca is connected to rotate together with the input shaft I. The ring gear r is connected to rotate together with the intermediate shaft M. In this way, the ring gear r is connected to the differential device D via the intermediate shaft M.

1-2 Rotary Electric Machine Control System

FIG. 2 shows an operation control system of the rotary electric machines mainly formed by the inverter In. The rotary electric machine control system includes the battery B, the rotary electric machines MG1 and MG2, and the inverter In interposed between the battery B and the rotary electric machines MG1 and MG2. The inverter In includes a voltage conversion section 4 and frequency conversion sections 5 arranged in this order from the side of the battery B. As is clear from FIG. 2, the frequency conversion sections 5 are individually provided for the pair of rotary electric machines MG1 and MG2. Current sensors (a first rotary electric machine current sensor Se7 and a second rotary electric machine current sensor Se8) are provided between the frequency conversion sections 5 and the rotary electric machines MG1 and MG2 to measure the amount of a current that flows through each rotary electric machine.

The battery B can not only supply electric power to the rotary electric machines MG1 and MG2 but also receive electric power from the rotary electric machines MG1 and MG2 to accumulate the electric power.

In the inverter In, the voltage conversion section 4 is formed by a voltage conversion circuit including a reactor 4a, a filter capacitor 4b, and a pair of upper and lower switching elements 4c and 4d. As each of the switching elements 4c and 4d, a MOSFET (MOS field-effect transistor) may be employed.

The source of the upper switching element 4c is connected to the drain of the lower switching element 4d, and connected to the plus side of the battery B via the reactor 4a. The drain of the upper switching element 4c is connected to the input plus side of each of the frequency conversion sections 5. The respective gates of the upper switching element 4c and the lower switching element 4d are connected to a driver circuit 7. The source of the lower switching element 4d is connected to the minus side (ground) of the battery B.

The switching elements 4c and 4d are subjected to PWM control performed by the driver circuit 7 on the basis of a required voltage provided as a voltage command output from rotary electric machine control unit 14 to be discussed later. Thus, a voltage from the battery B is boosted and supplied to the frequency conversion sections 5. On the other hand, in the case where electric power is received from the rotary electric machine MG2, a voltage from the rotary electric machine MG2 is reduced and supplied to the battery B.

An inverter circuit forming each of the frequency conversion sections 5 includes upper and lower switching elements 8a, 8b, 8c, 8d, 8e, and 8f. Also as each of the switching elements 8a, 8b, 8c, 8d, 8e, and 8f, a MOSFET (MOS field-effect transistor) may be employed.

The respective drains of the upper switching elements 8a, 8b, and 8c are connected to the output plus side of the voltage conversion section 4. The respective gates of the upper switching elements 8a, 8b, and 8c are connected to the driver circuit 7. The sources of the upper switching elements 8a, 8b, and 8c are respectively connected to the drains of the lower switching elements 8d, 8e, and 8f. The respective gates of the lower switching elements 8d, 8e, and 8f are connected to the driver circuit 7. The respective sources of the lower switching elements 8d, 8e, and 8f are connected to the output minus side of the voltage conversion section 4, that is, the minus side (ground) of the battery B.

Intermediate points 9u, 9v, and 9w between the pairs of upper and lower switching elements (8a, 8d), (8b, 8e), and (8c, 8f) are respectively connected to windings for U-phase, V-phase, and W-phase of a corresponding one of the rotary electric machines MG1 and MG2. Currents that energize the windings are respectively detected by current detection sensors Se7 and Se8, and the detected current values are delivered to the driver circuit 7 and further sent to the control device ECU.

The switching elements 8a, 8b, 8c, 8d, 8e, and 8f are subjected to PWM control performed by the driver circuit on the basis of a required rotational speed and a required torque output from rotary electric machine control unit 14 to be discussed later. Thus, the rotary electric machines MG1 and MG2 are operated in accordance with the required rotational speed and the required torque (a limit torque in the case where torque limitation is performed). In the case where electric power is received from the rotary electric machines MG1 and MG2, an AC at a predetermined frequency is converted into a DC.

As schematically shown in FIG. 3, the inverter In includes a heat exchanger 9 that cools the switching elements 4c, 4d, 8a, 8b, 8c, 8d, 8e, and 8f, which produce heat through energization to become hot. The heat exchanger 9 has the switching element 8a (the other switching elements are not shown) tightly fixed to an external side thereof, and has formed therein a cooling water passage 9a in which cooling water serving as a cooling medium flows through. One end and the other end of a cooling water circulation path 10 are respectively connected to an inlet port and an outlet port of the cooling water passage 9a. The cooling water circulation path 10 cools cooling water at a high temperature delivered from the heat exchanger 9, and returns the cooling water at a reduced temperature to the heat exchanger 9.

1-3. Vehicle Drive System

The entire vehicle drive system 200 according to the present application will be described below with reference to FIG. 3 with a focus on the control device ECU serving as the core of the system.

As shown in FIG. 3, the control device ECU controls operation of the engine E, the first rotary electric machine MG1, the second rotary electric machine MG2, and so forth using information acquired from sensors Se1 to Se8 provided at various portions of the vehicle. The operation of the first rotary electric machine MG1 and the second rotary electric machine MG2 is controlled via the inverter In described earlier.

In the example, a first rotary electric machine rotational speed sensor Se1, a second rotary electric machine rotational speed sensor Se2, an engine speed sensor Se3, a battery state detection sensor Se4, a vehicle speed sensor Se5, an accelerator pedal operation detection sensor Se6, a first rotary electric machine current sensor Se7, and a second rotary electric machine current sensor Se8 are provided.

The first rotary electric machine rotational speed sensor Se1 is a sensor configured to detect the rotational speed of the rotor Ro1 of the first rotary electric machine MG1. The second rotary electric machine rotational speed sensor Se2 is a sensor configured to detect the rotational speed of the rotor Ro2 of the second rotary electric machine MG2. The engine speed sensor Se3 is a sensor configured to detect the rotational speed of the output rotary shaft of the engine E. In the example, the input shaft I rotates together with the output rotary shaft of the engine E, and therefore the rotational speed of the engine E detected by the engine speed sensor Se3 coincides with the rotational speed of the input shaft I. The battery state detection sensor Se4 is a sensor configured to detect a charge amount of the battery B, a current that flows through the battery, a voltage of the battery, and so forth. The vehicle speed sensor Se5 is a sensor configured to detect the rotational speed of an input shaft (not shown) of the differential device D in order to detect the vehicle speed. The accelerator pedal operation detection sensor Se6 is a sensor configured to detect an operation amount of an accelerator pedal 18. The first rotary electric machine current sensor Se7 and the second rotary electric machine current sensor Se8 are provided in the inverter In, and are configured to detect respective currents that flow through the first rotary electric machine MG1 and the second rotary electric machine MG2.

The control device ECU includes required drive force determination unit 11, running condition determination unit 12, engine control unit 13, and rotary electric machine control unit 14. The control device ECU further includes torque limitation unit 15 for executing torque limitation under predetermined conditions, which is unique to the present application. The torque limitation unit 15 includes battery electric power calculation unit 15a, battery electric power variation rate calculation unit 15b, rotational speed variation rate calculation unit 15c, torque limitation determination unit 15d, and torque limit value calculation unit 15e.

Each unit of the control device ECU has an arithmetic processing unit such as a CPU as its core member, and a functional section that is configured to perform various processes on input data and that may be implemented by hardware, software, or a combination of both.

The required drive force determination unit 11 computes and determines a drive force required by a driver on the basis of outputs from the vehicle speed sensor Se5 and the accelerator pedal operation detection sensor Se6.

The engine control unit 13 not only starts and stops operation of the engine E but also controls operation of the engine through rotational speed control, output torque control, and so forth according to a rotational speed and an output torque required of the engine determined by the running condition determination unit 12. The rotary electric machine control unit 14 controls operation of the first rotary electric machine MG1 and the second rotary electric machine MG2 via the inverter In through rotational speed control, torque control, and so forth according to a rotational speed and an output torque required of each of the rotary electric machines MG1 and MG2 determined by the running condition determination unit 12.

The running condition determination unit 12 determines running conditions required of the vehicle, such as the rotational speed (required rotational speed) and the output torque (required torque) of the engine E and the rotational speed (required rotational speed) and the output torque (required torque) of each of the first rotary electric machine MG1 and the second rotary electric machine MG2, in accordance with information on the vehicle speed obtained from the vehicle speed sensor Se5, information on the required drive force obtained from the required drive force determination unit 11, information on the charge amount of the battery obtained from the battery state detection sensor Se4, and so forth using a map or the like provided in advance.

Determination of the running conditions performed by the running condition determination unit 12 is described by way of example. In the case where the amount of charge accumulated in the battery B is sufficient, for example, the engine E is required to produce a rotational speed and a torque according to operating conditions under which the engine E can exhibit an optimum fuel efficiency, the second rotary electric machine MG2 is required to produce a torque for supplementing the torque produced by the engine E operating under the above operating conditions, and the first rotary electric machine MG1 is required to produce a torque distributed to the first rotary electric machine MG1 by the power distribution mechanism P1 (in this state, the required torque is negative because the first rotary electric machine MG1 is serving as a generator). The respective rotational speeds to be produced by the first rotary electric machine MG1 and the second rotary electric machine MG2, namely their required rotational speeds, are determined in accordance with the configuration of the power distribution mechanism P1 discussed above, the gear ratios of the gears provided in the drive system, and so forth.

On the other hand, in the case where the amount of charge accumulated in the battery B is small and braking is applied to the vehicle, the operating conditions of the engine E, the first rotary electric machine MG1, and the second rotary electric machine MG2 are determined to increase electric power generated by the first rotary electric machine MG1 with the rotational speed of the second rotary electric machine MG2 serving as a motor suppressed. In this case, the rotational speed of the wheels W and hence the rotational speed of the second rotary electric machine MG2 have been reduced with braking applied to the vehicle. In this state, the engine speed is increased to increase the rotational speed of the first rotary electric machine MG1 serving as a generator, given the relationship of connection of the gears of the planetary gear mechanism in the power distribution mechanism P1. As a result, the amount of electricity generated by the first rotary electric machine MG1 is increased to change the battery B.

The required rotational speed and the required torque for the engine E determined by the running condition determination unit 12 are sent to the engine control unit 13, which controls operation of the engine E so as to meet the required rotational speed and the required torque. On the other hand, the required rotational speed and the required torque for each of the first rotary electric machine MG1 and the second rotary electric machine MG2 are sent to the rotary electric machine control unit 14, which generates operation control information for each of the rotary electric machines. Also, the required rotational speed and the required torque for each of the first rotary electric machine MG1 and the second rotary electric machine MG2 are converted into a frequency command corresponding to the required rotational speed and a current command corresponding to the required torque, and sent to the inverter In, which controls operation of each of the rotary electric machines MG1 and MG2 via the driver circuit 7.

As shown in FIG. 3, the rotary electric machine control unit 14 includes an inverter voltage determination section 14a. As mentioned earlier, the rotary electric machine control unit 14 receives the required rotational speed and the required torque for each of the rotary electric machines MG1 and MG2 from the running condition determination unit 12. The inverter In employed in the example includes a common voltage conversion section 4, and a DC voltage obtained through voltage conversion performed by the common voltage conversion section 4 (such a voltage is referred to as an "inverter voltage") is applied to each of the frequency conversion sections 5. Thus, from the required rotational speed and the required torque for each of the rotary electric machines MG1 and MG2, the rotary electric machine control unit 14 calculates a frequency value and a current value separately for each of the rotary electric machines MG1 and MG2 required for the inverter In to control the rotary electric machines MG1 and MG2, and further calculates a DC voltage separately required for each of the rotary electric machines MG1 and MG2 (such voltages are respectively referred to as a "first voltage" and a "second voltage"). Then, the rotary electric machine control unit 14 determines the higher one of the pair of first voltage and second voltage as the inverter voltage.

Thus, the rotary electric machine control unit 14 calculates the inverter voltage Vc and the frequency value and the current value for each of the rotary electric machines MG1 and MG2 as command values for the inverter In, and sends such command values to the inverter In.

In the case described above, the engine E and the pair of rotary electric machines MG1 and MG2 are operated in accordance with the running conditions as determined by the running condition determination unit 12.

In the present application, in such a normal running state, the torque limitation unit 15 limits the torque of the rotary electric machine serving as a motor under predetermined conditions in the case where there is a possibility that an over-current flows through the battery. In a state in which torque limitation is executed, the torque of the rotary electric machine serving as a motor is limited to a torque limit value.

The torque limitation unit 15 includes battery electric power calculation unit 15a, battery electric power variation rate calculation unit 15b, rotational speed variation rate calculation unit 15c, torque limitation determination unit 15d, and torque limit value calculation unit 15e.

1. Battery Electric Power Calculation Unit

The battery electric power calculation unit 15a is unit for calculating battery electric power in a current state. In the embodiment, the battery electric power is electric power drawn from the battery (electric power that the battery is required to supply) in the case where, for the pair of rotary electric machines, one of the rotary electric machines serves as a motor and the other serves as a generator in accordance with the running conditions (the required torque and the required rotational speed) determined by the running condition determination unit 12.

The battery electric power is calculated as the sum of motor electric power (Formula 1), generator electric power (Formula 2), a booster converter loss, and capacitor charge electric power (Formula 3), each of which is described below. These are all estimated values and are calculated in accordance with the following formulas, except for some (a motor loss, a generator loss, and the booster converter loss) which are obtained utilizing a map or the like obtained in advance in accordance with the running conditions. These values may be calculated on the basis of an estimation formula obtained empirically in advance.

Motor electric power [W]=motor required torque× motor required rotational speed×2π/60+motor loss (where the motor loss is determined empirically)      Formula 1

Generator electric power [W]=generator required torque×generator required rotational speed×2π/60+generator loss (where the generator loss is determined empirically)      Formula 2

In these formulas, the torque is represented in units of [Nm], and the rotational speed is represented in units of [rpm] (the same applies hereinbelow).

The booster converter loss is a loss caused by varying a voltage across a converter in a configuration including the voltage conversion section 4 (a voltage boosting section) as in the example.

Figure 4:
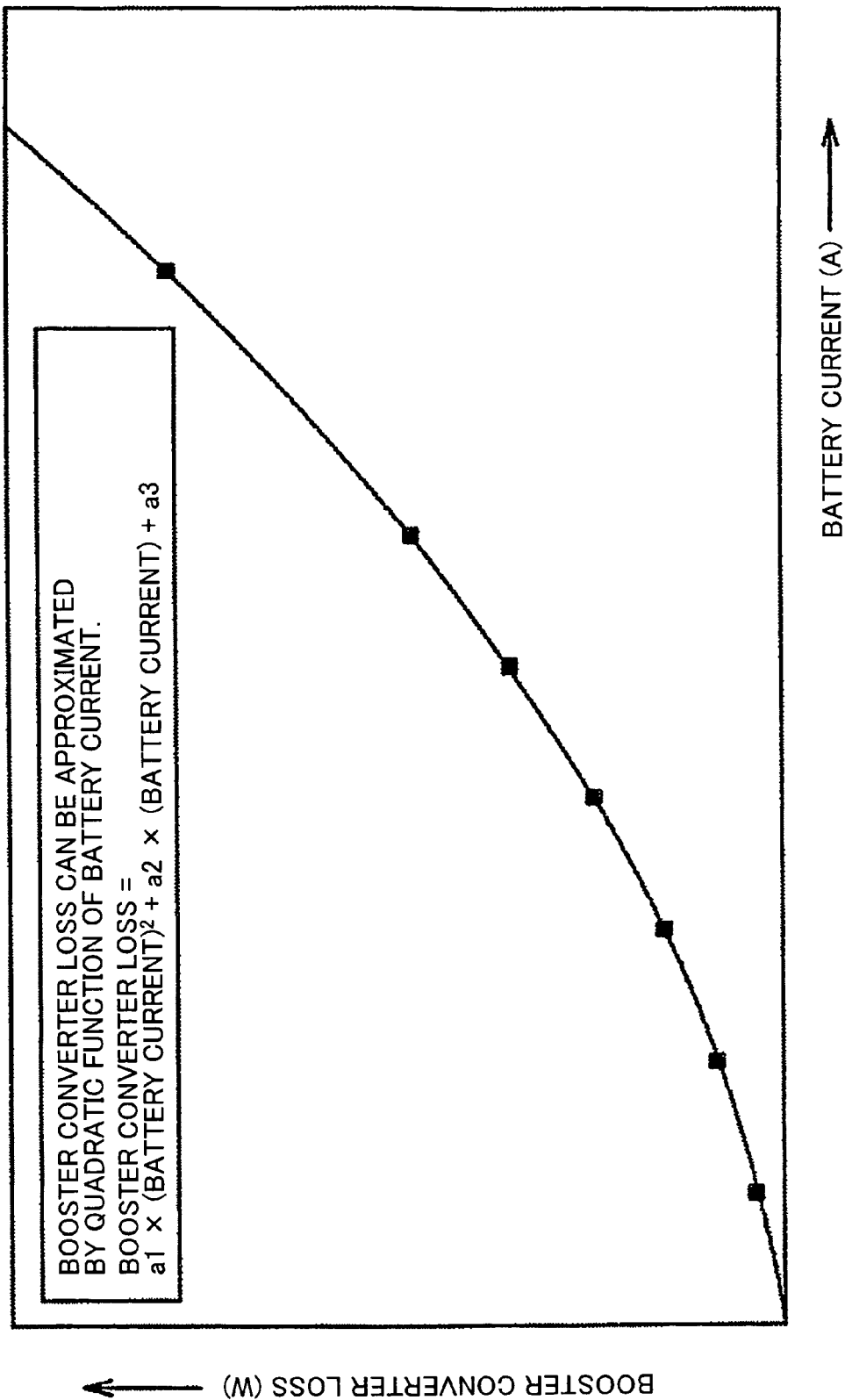
FIG. 4 shows a map of a booster converter loss.

Specifically, the booster converter loss is a loss caused between p1 and p2 in FIG. 2. This value is also obtained empirically. FIG. 4 shows the relationship between the battery current [A] and the booster converter loss [W]. Thus, the booster converter loss at a certain time can be calculated by obtaining the battery current and using FIG. 4 or an approximate formula provided in the upper part of FIG. 4. In the approximate formula, a1, a2, and a3 are each a constant determined in advance. As the battery current, the current detected by the battery state detection sensor Se4 mentioned earlier may be used. Further, in the present application, the battery electric power is calculated sequentially over time, and therefore the battery current may be calculated by dividing the preceding battery electric power, which is included in the sequentially calculated battery electric power, by the current battery voltage measured by the battery state detection sensor Se4.

The capacitor charge electric power is calculated on the basis of the following formula, where the capacitance of a smoothing capacitor 17 (see FIG. 2) is represented as C[F] and Δt represents a time step.

vCapacitor charge electric power=[C×(boosted voltage)²/2−C×(preceding boosted voltage)²/2]/Δt      Formula 3

Thus, the battery electric power is calculated by the following formula.

Battery electric power=motor electric power+generator electric power+booster converter loss+capacitor charge electric power      Formula 4 v2. Battery Electric Power Variation Rate Calculation Unit

The battery electric power variation rate calculation unit 15b calculates the absolute value of the difference between the current battery electric power and the battery electric power a unit time step before as a battery electric power variation rate.

3. Rotational Speed Variation Rate Calculation Unit

The rotational speed variation rate calculation unit 15c calculates, for the rotary electric machine serving as a motor, the absolute value of the difference between the current rotational speed and the rotational speed a unit time step before as a rotational speed variation rate.

4. Torque Limitation Determination Unit

Figure 5:
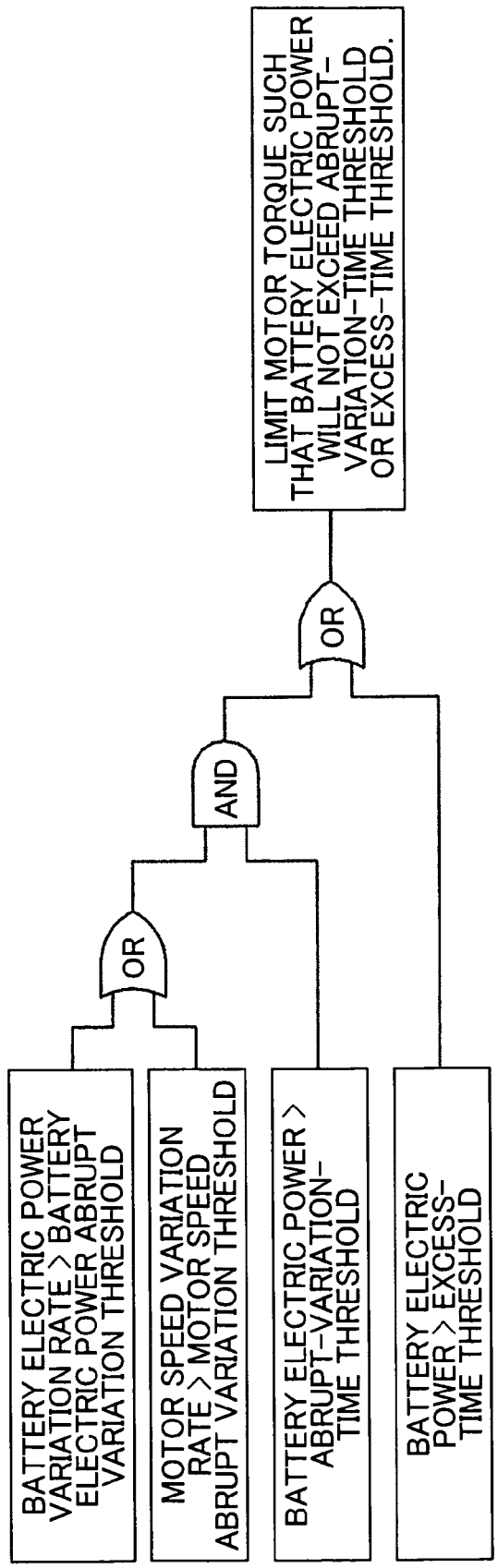
FIG. 5 shows the concept of torque limitation according to the present application.

The torque limitation determination unit 15d is a unit for determining whether or not to perform torque limitation. In the present application, torque limitation is performed under any of the conditions described below. In the case where no torque limitation is performed, each of the rotary electric machines is controlled to the required torque and the required rotational speed. FIG. 5 schematically shows the conditions for torque limitation in the present application.

In the present application, torque limitation is performed in either of a case where the battery electric power is excessive (Condition 1) and a case where the battery electric power is varying abruptly (Condition 2).

Condition 1 (During Excess Time)

During an excess time when the current battery electric power is higher than an excess-time threshold for determining whether or not the battery electric power is excessive as shown in the lowermost line of FIG. 5, the torque limitation unit executes torque limitation unconditionally.

During a non-excess time when the battery electric power is lower than the excess-time threshold, torque limitation is not executed and the rotary electric machine serving as a motor is controlled on the basis of the required rotational speed and the required torque except under Condition 2 described below.

Condition 2 (During Abrupt Variation Time)

During an abrupt variation time when the battery electric power is higher than an abrupt-variation-time threshold for determining whether or not the battery electric power is varying abruptly, the state of the battery electric power variation rate and the state of the motor speed variation rate are monitored, and in the case where either of the battery electric power variation rate and the motor speed variation rate is higher than a corresponding predetermined value as shown in the three upper lines of FIG. 5, the torque limitation unit executes torque limitation. In the present application, the functional unit that determines the state of the battery electric power variation rate and the state of the motor speed variation rate during an abrupt variation time when the battery electric power is higher than an abrupt-variation-time threshold for determining whether or not the battery electric power is varying abruptly forms the "battery electric power abrupt variation estimation unit". That is, the "battery electric power abrupt variation estimation unit" estimates that the battery electric power is in an abrupt variation state in which the battery electric power is varying abruptly on the basis of at least one of the variation rate of the battery electric power and the variation rate of the rotational speed of the rotary electric machine.

During a non-abrupt variation time when the battery electric power is lower than the abrupt-variation-time threshold, torque limitation is not executed and the rotary electric machine serving as a motor is controlled on the basis of the required rotational speed and the required torque except under Condition 1 described above.

Regarding the state of the battery electric power variation rate, the battery electric power is determined to be varying abruptly as considered on the basis of the battery electric power in the case where the battery electric power variation rate is higher than a battery electric power abrupt-variationtime threshold for determining whether or not the battery electric power variation rate is high.

Regarding the state of the rotational speed variation rate, the battery electric power is determined to be varying abruptly as considered on the basis of the rotational speed in the case where the rotational speed variation rate is higher than a rotational speed abrupt-variation-time threshold for determining whether or not the rotational speed variation rate is high.

The relationship between Condition 1 and Condition 2 is described. The excess-time threshold described earlier is set to be larger than the abrupt-variation-time threshold.

In the case where torque limitation is executed as a result of the above determinations, the torque limit value calculation unit 15*e* operates to calculate a torque limit value at the time.

5. Torque Limit Value Calculation Unit

Also for the torque limit value, the system according to the present application is structured to calculate different torque limit values, namely an excess-time torque limit value and an abrupt-variation-time torque limit value. That is, as shown in FIG. 3, the torque limit value calculation unit 15*e* includes excess-time torque limit value calculation unit 15*f* and abrupt-variation-time torque limit value calculation unit 15*f*.

Excess-Time Torque Limit Value Calculation Unit

The excess-time torque limit value calculation unit 15*f* calculates, during an excess time, a torque limit value on the basis of excess-time limit electric power, which is a maximum value of the battery electric power that is allowed during the excess time. The excess-time limit electric power is substantially the same value as the excess-time threshold set in advance for the battery electric power described above.

Specifically, the excess-time torque limit value is calculated by Formula 5 below.

Excess-time torque limit value [Nm]=(excess-time limit electric power−generator electric power−motor loss−booster converter loss−capacitor charge electric power)/[(2π/60)×motor speed]    Formula 5

Abrupt-Variation-Time Torque Limit Value Calculation Unit

The abrupt-variation-time torque limit value calculation unit 15*g* calculates, during an abrupt variation time, a torque limit value on the basis of abrupt-variation-time limit electric power, which is a maximum value of the battery electric power that is allowed during the abrupt variation time. The abrupt-variation-time limit electric power is substantially the same value as the abrupt-variation-time threshold set in advance for the battery electric power described above.

Specifically, the abrupt-variation-time torque limit value is calculated by Formula 6 below.

Abrupt-variation-time torque limit value [Nm]= (abrupt-variation-time limit electric power−generator electric power−motor loss−booster converter loss−capacitor charge electric power)/[(2π/60)×motor speed]    Formula 6

Thus, the excess-time limit electric power is higher than the abrupt-variation-time limit electric power.

The configuration of the rotary electric machine control system according to the present application has been described above.

The torque limitation performed by the rotary electric machine control system will be described below with reference to FIGS. 6, 7, and 8.

Figure 6:
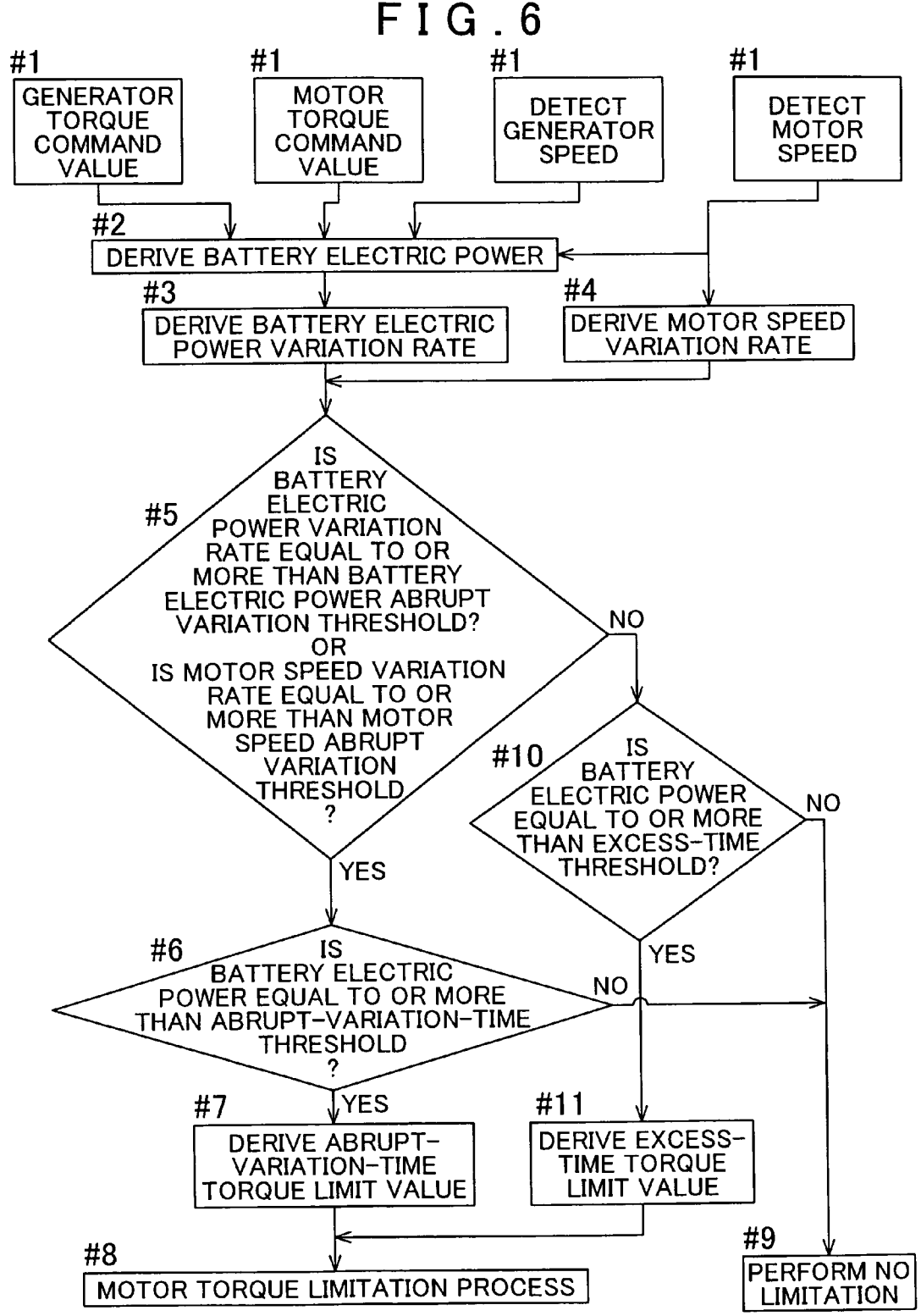
FIG. 6 shows the flow of a torque limitation process.

FIG. 6 is a flowchart of a torque limitation process according to the embodiment.

The torque limitation process is repeated with a predetermined time step all through the period once an ignition key is turned on until it is turned off.

In the process, as shown in the uppermost line in the flowchart of FIG. 6, the respective required torques for the generator and the motor are read, and the respective rotational speeds of the generator and the motor are detected (step #1). In FIG. 6, the required torques are referred to as "torque command values". Also, the detected rotational speeds (actual rotational speeds) are equivalent to the required rotational speeds.

After obtaining such information, the battery electric power calculation unit 15*a* derives the battery electric power at the time (step #2), and the battery electric power variation rate calculation unit 15*b* derives the variation rate of the battery electric power (step #3). Meanwhile, the rotational speed variation rate calculation unit 15*c* derives the rotational speed variation rate of the rotary electric machine serving as a motor from the sequentially read motor speed (step #4).

Through the above processes, the battery electric power, the battery electric power variation rate, and the rotational speed variation rate at the time are obtained.

The torque limitation determination unit 15*d* determines on the basis of the battery electric power variation rate and the rotational speed variation rate obtained as described above whether or not any of the conditions that the battery electric power variation rate is equal to or more than the battery electric power abrupt-variation-time threshold and that the rotational speed variation rate is equal to or more than the rotational speed abrupt-variation-time threshold is met (step #5). In this way, it is determined as considered on the basis of the variation rates whether or not the battery electric power is varying abruptly. In the case where any of the conditions is met (step #5: yes), it is determined whether or not the battery electric power is equal to or higher than the abrupt-variation-time threshold (step #6). Thus, it is determined as considered on the basis of the magnitude of the battery electric power whether or not the battery electric power is varying abruptly. In the case where it is determined that the battery electric power is varying abruptly (step #6: yes), the abrupt-variation-time torque limit value calculation unit 15*g* derives the abrupt-variation-time torque limit value (step #7), and motor torque limitation is executed on the basis of the calculated value (step #8). In the case where it is determined that the battery electric power is not varying abruptly (step #6: no), no limitation is performed (step #9), and the rotary electric machine serving as a motor is operated in accordance with the required torque and the required rotational speed.

In the case where any of the conditions is not met as from the battery electric power variation rate and the rotational speed variation rate (step #5: no); it is determined whether or not the battery electric power is equal to or higher than the excess-time threshold (step #10). Thus, it is determined as considered on the basis of the magnitude of the battery electric power whether or not the battery electric power is excessive. In the case where it is determined that the battery electric power is excessive (step #10: yes), the excess-time torque limit value calculation unit 15*f* derives the excess-time torque limit value (step #11), and motor torque limitation is executed on the basis of the calculated value (step #8). In the case where it is determined that the battery electric power is not excessive (step #10: no), no limitation is performed (step #9), and the rotary electric machine serving as a motor is operated in accordance with the required torque and the required rotational speed.

The process flow of the torque limitation process has been described above. A case where torque limitation is performed on the basis of abruptly varying battery electric power and a case where torque limitation is performed on the basis of excessive battery electric power will be described below with reference to FIGS. 7 and 8.

Figure 7:
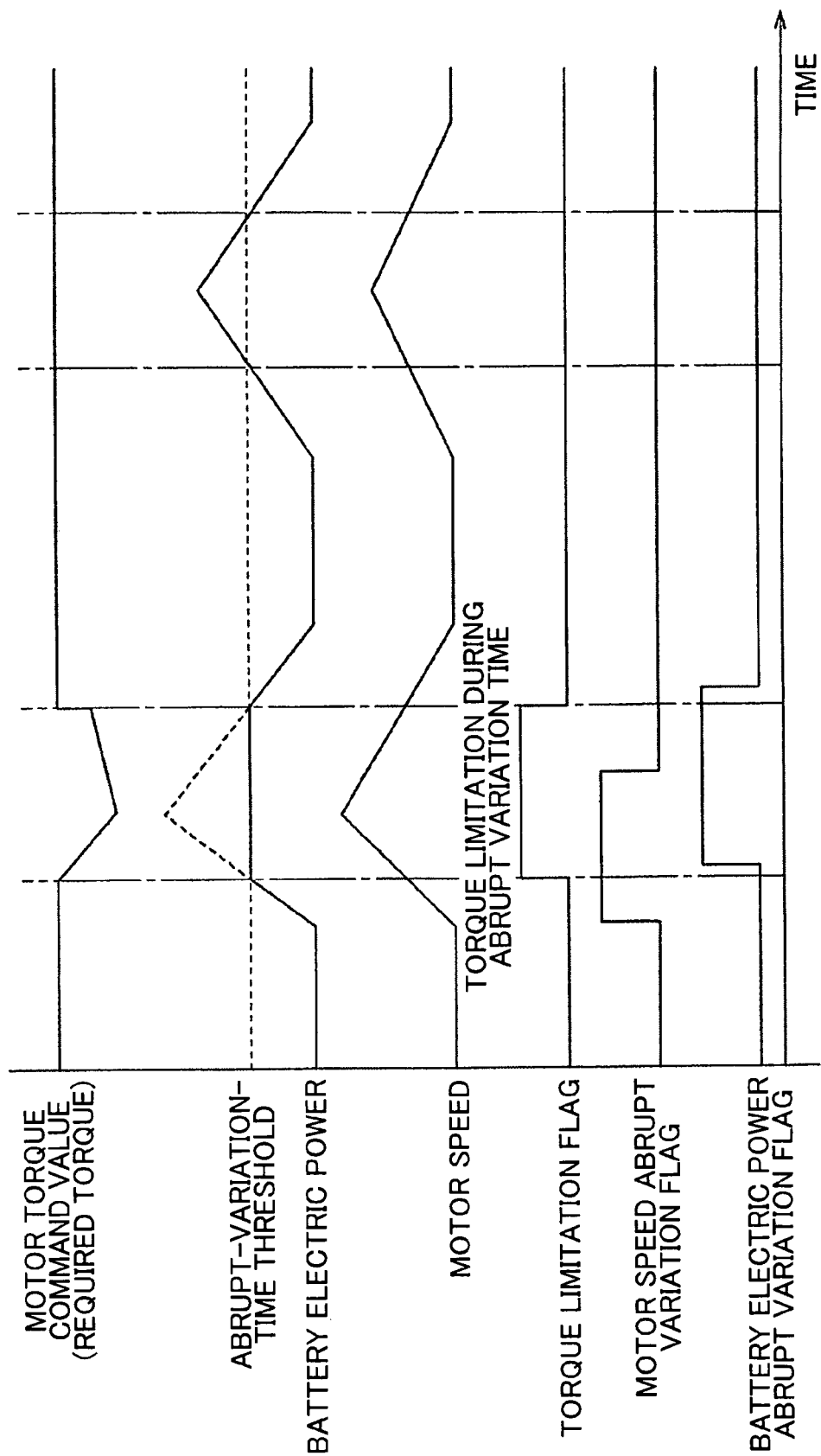
FIG. 7 shows a state of torque limitation during an abrupt variation time.
Figure 8:
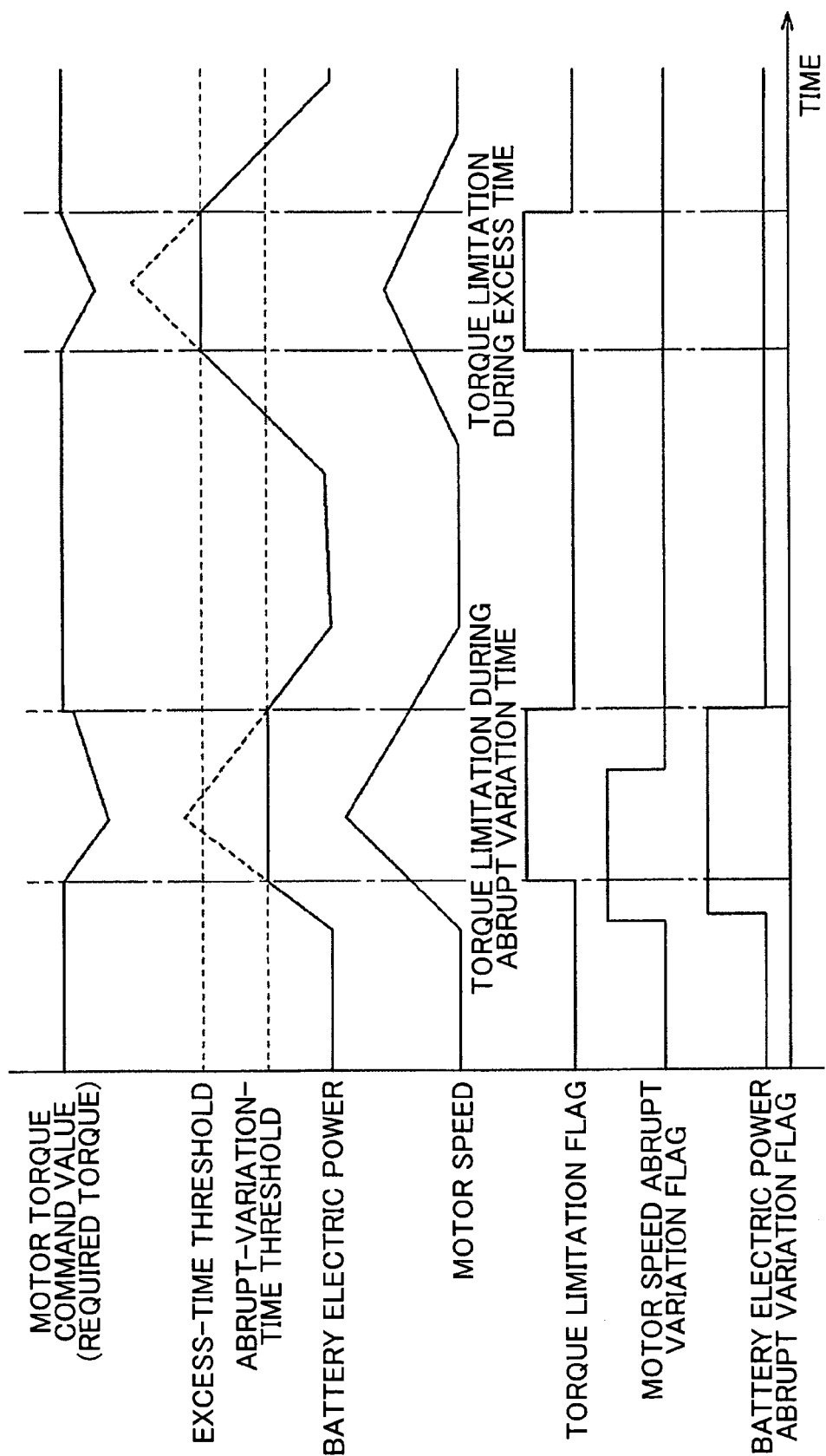
FIG. 8 shows a state of torque limitation during an abrupt variation time and during an excess time.

FIGS. 7 and 8 each show a state in which torque limitation is executed. In FIG. 7, a state in which torque limitation is executed with the battery electric power varying abruptly (during an abrupt variation time, as referred to above) is shown on the left side, and a state in which no torque limitation is performed but a normal operating state is maintained with the battery electric power not varying abruptly or becoming excessive (during a non-abrupt variation time and during a non-excess time, as referred to above) is shown on the right side.

Meanwhile, in FIG. 8, a state in which torque limitation is executed with the battery electric power varying abruptly is shown on the left side, and a state in which torque limitation is performed with the battery electric power not determined as varying abruptly but being excessive (during an excess time, as referred to above) is shown.

In FIGS. 7 and 8, the horizontal axis represents the time. In FIG. 7, the vertical axis represents a battery electric power abrupt variation flag, a motor speed abrupt variation flag, a torque limitation flag, the motor speed, the battery electric power, the abrupt-variation-time threshold (a threshold of the battery electric power used to determine that the battery electric power is varying abruptly), and a motor torque command value arranged in this order from the bottom. The motor torque command value is equivalent to the required torque for the rotary electric machine serving as a motor, as referred to above. In FIG. 8, the vertical axis represents a battery electric power abrupt variation flag, a motor speed abrupt variation flag, a torque limitation flag, the motor speed, the battery electric power, the abrupt-variation-time threshold, a motor torque command value, and in addition the excess-time threshold.

Abrupt Variation

The left side of FIG. 7 shows a state in which the motor speed and the battery electric power vary abruptly to increase. In the state shown, torque limitation is performed with the motor speed varying abruptly and the battery electric power exceeding the abrupt-variation-time threshold. Thus, the torque limitation flag is set. When torque limitation is performed, the motor torque command value is reduced successively. When the motor speed turns into a decrease, the motor torque command value also turns into an increase. While there is still a possibility that it is determined that the battery electric power is varying abruptly in view of the variation rate of the battery electric power, torque limitation is terminated when the battery electric power falls below the abrupt-variation-time threshold.

The right side of FIG. 7 shows a state in which the motor speed and the battery electric power gradually increase. In this state, it is not determined that the motor speed and the battery current are varying abruptly even when the battery electric power exceeds the abrupt-variation-time threshold, and therefore no torque limitation is performed.

Excess

The left side of FIG. 8 shows a state similar to FIG. 7, in which torque limitation is performed along with abrupt variations. The left side of FIG. 8 shows a state in which the motor speed and the battery electric power vary abruptly to increase.

The right side of FIG. 8 shows a state in which the motor speed and the battery electric power do not vary abruptly but the battery electric power becomes excessive. In the state shown, torque limitation is performed with the motor speed increasing gradually and the battery electric power exceeding the excess-time threshold. Thus, the torque limitation flag is set. When torque limitation is performed, the motor torque command value is reduced successively. When the motor speed turns into a decrease, the motor torque command value turns into an increase. When the battery electric power falls below the excess-time threshold, torque limitation is terminated.

As described above, it is possible to prevent occurrence of an over-current by performing torque limitation not only during an abrupt variation time but also during an excess time. Further, it is possible to reliably prevent an over-current even during an abrupt variation time by performing a determination on the basis of the magnitude of the battery electric power itself and also performing a determination on the basis of the variation rate of the rotational speed of the rotary electric machine serving as a motor.

Other Embodiments (1) In the embodiment described above, a single abrupt-variation-time threshold and a single excess-time threshold are used as the thresholds of the battery electric power. However, an upper threshold for use when the battery electric power is increasing and a lower threshold for use when the battery electric power is decreasing may be provided for each threshold. Such a pair of values are provided for each threshold for the purpose of providing each threshold with a hysteresis to compensate for a control delay or the like. The state of executing torque limitation with this configuration is shown in FIGS. 9 and 10, which respectively correspond to FIGS. 7 and 8.

Figure 9:
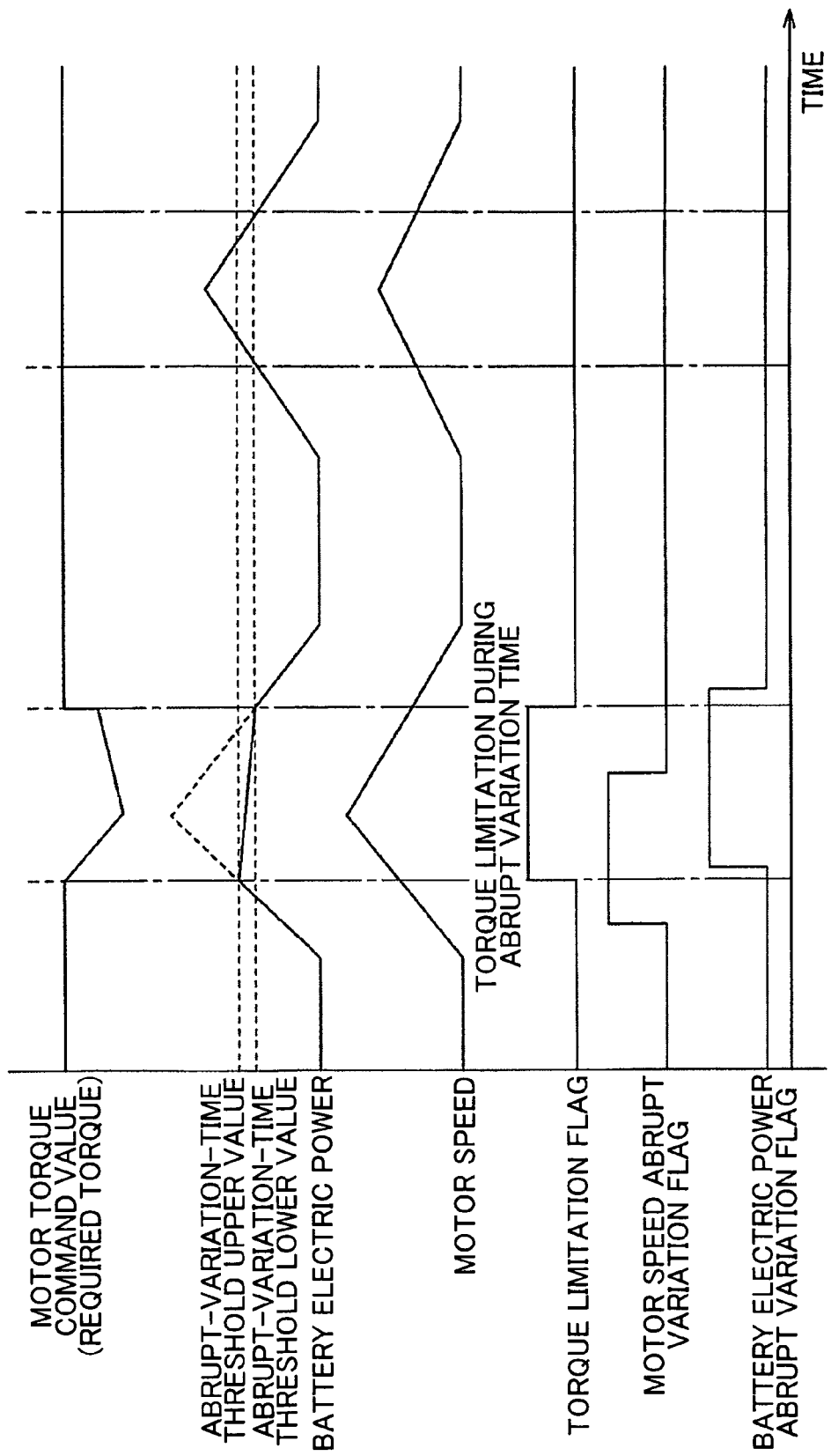
FIG. 9 shows a state of torque limitation during an abrupt variation time in the case where a hysteresis is provided to an abrupt-variation-time threshold.

In FIG. 9, an abrupt-variation-time threshold upper value and an abrupt-variation-time threshold lower value are provided as the abrupt-variation-time threshold. With this configuration, the abrupt-variation-time threshold upper value is used when the battery electric power is increasing, and the abrupt-variation-time threshold lower value is used when the battery electric power is decreasing. Thus, it is possible to compensate for a control delay or the like, and to realize stable torque limitation with rare occurrence of hunting or the like.

In FIG. 10, in addition to the abrupt-variation-time threshold, an excess-time threshold upper value and an excess-time threshold lower value are provided as the excess-time threshold. With this configuration, the excess-time threshold upper value is used when the battery electric power is increasing, and the excess-time threshold lower value is used when the battery electric power is decreasing. Thus, it is possible to compensate for a control delay or the like, and to realize stable torque limitation with rare occurrence of hunting or the like.

(2) In the embodiment described above, the present invention is applied to a split hybrid drive device including an engine and a pair of rotary electric machines. However, the present invention may also be employed in a hybrid drive device including a single rotary electric machine. The present invention may further be applied to a drive device including a rotary electric machine serving as a motor (a running device that runs only on an electric motor).

(3) A hybrid drive device including a single rotary electric machine may be employed in various drive devices shown in FIG. 11. FIG. 11 shows various configurations described below.

Figure 11A:
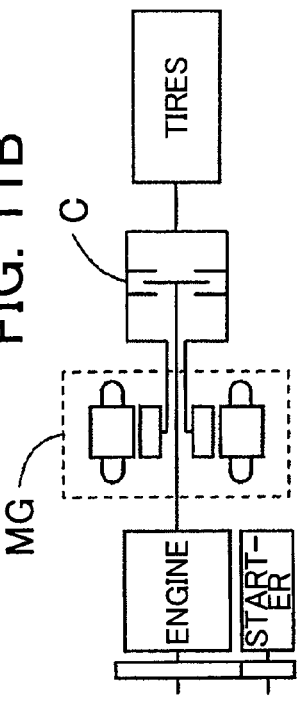
FIG. 11 shows configurations of a drive device not including a rotary electric machine serving as a generator but including a single rotary electric machine serving as a motor.

FIG. 11A shows a configuration in which a rotary electric machine MG is coupled to a continuously variable transmission CVT coupled to wheels (not shown) provided on the downstream side in the transfer path so that an output from an engine can be transferred to the transmission CVT via a clutch C.

Figure 11C:
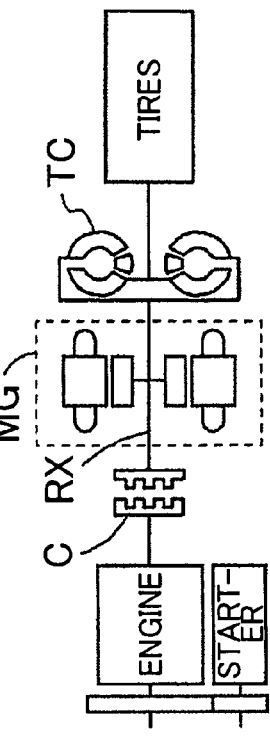
Figure 11E:
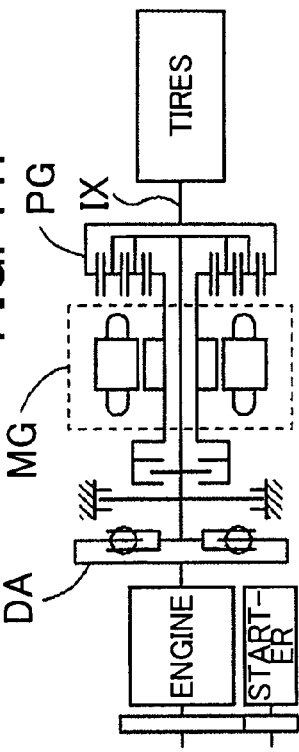
Figure 11B:
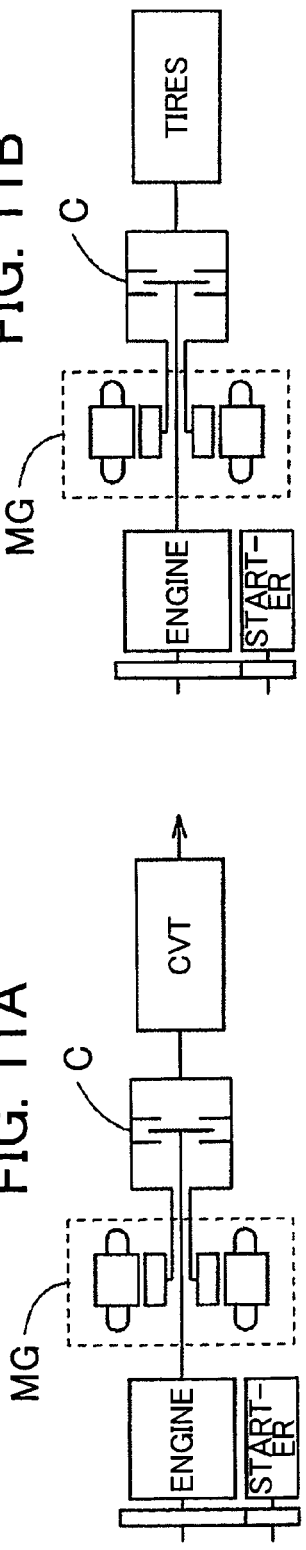

FIG. 11B shows a configuration similar to that shown in FIG. 11A except that the rotary electric machine MG is directly coupled to the wheels (referred to as tires in the drawing) not via a continuously variable transmission.

FIG. 11C shows a configuration in which a rotary electric machine MG is coupled via a torque converter TC to a continuously variable transmission CVT coupled to wheels (not shown) provided on the downstream side in the transfer path, and in which an output from an engine can be coupled via a clutch C to the upstream side, in the transfer path, of a rotor shaft RX of the rotary electric machine MG.

Figure 11D:
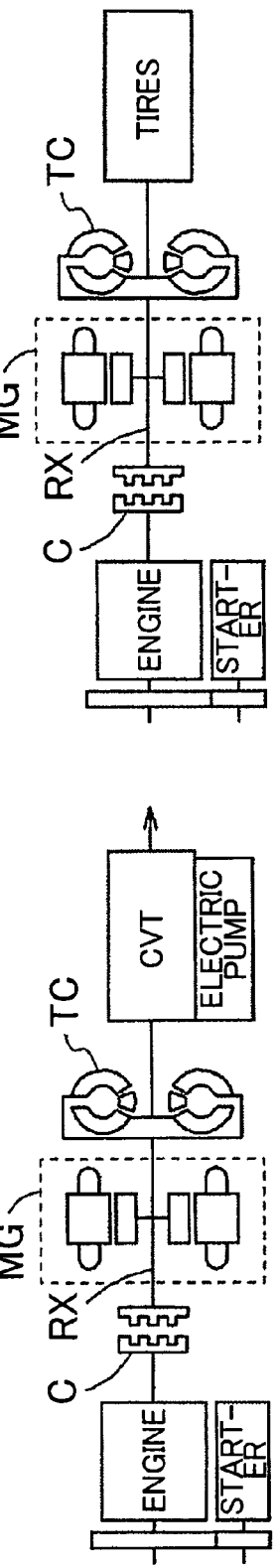

FIG. 11D shows a configuration similar to that shown in FIG. 11C except that the rotary electric machine MG is directly coupled to the wheels (referred to as tires in the drawing) not via a continuously variable transmission.

FIG. 11E shows a configuration in which a planetary gear mechanism PG is provided on an input shaft IX of a transmission TM coupled to wheels (not shown) provided on the downstream side in the transmission path, motive power from an engine is transferred to an element of the planetary gear mechanism PG via a damper DA, and a rotary electric machine MG is coupled to another element of the planetary gear mechanism PG to enable running on the rotary electric machine MG alone and running on a drive force from both the engine and the rotary electric machine MG.

Figure 11F:
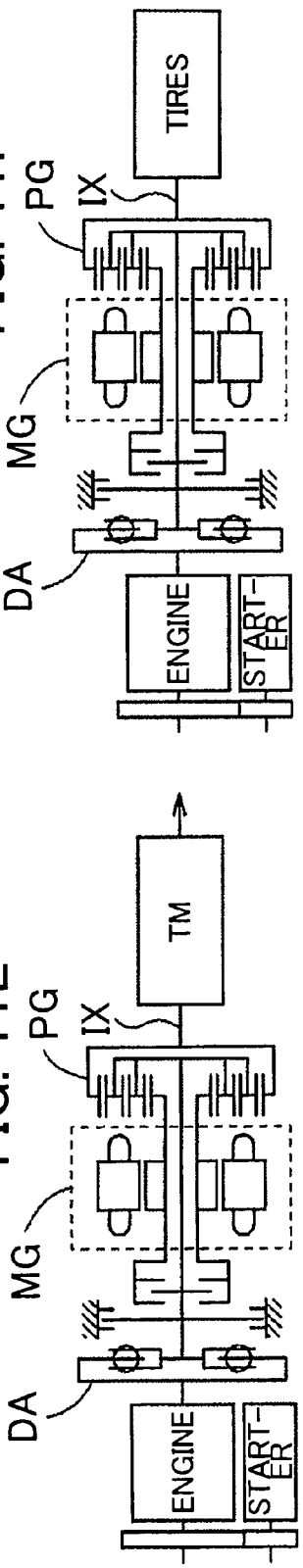

FIG. 11F shows a configuration similar to that shown in FIG. 11E except that the rotary electric machine MG is coupled directly to the wheels (referred to as, tires in the drawing) not via a transmission.

In drive devices not including a rotary electric machine serving as a generator, the formulas used by the various units described above are changed as described below.

1. Battery Electric Power Calculation Unit

The battery electric power calculation unit 15a derives battery electric power also in this case.

The battery electric power is electric power that the battery is required to supply to the rotary electric machine serving as a motor with the rotary electric machine operating in accordance with the required torque and the required rotational speed, and thus only an element of the rotary electric machine serving as a motor involves the battery electric power.

The battery electric power is calculated as motor electric power (Formula 11) given below.

Motor electric power $[W]$=motor required torque× motor required rotational speed×$2\pi/60$+motor loss (which is determined empirically)　　Formula 11

Thus, the battery electric power is calculated by the following formula.

Battery electric power=motor electric power　　Formula 12

Figure 12:
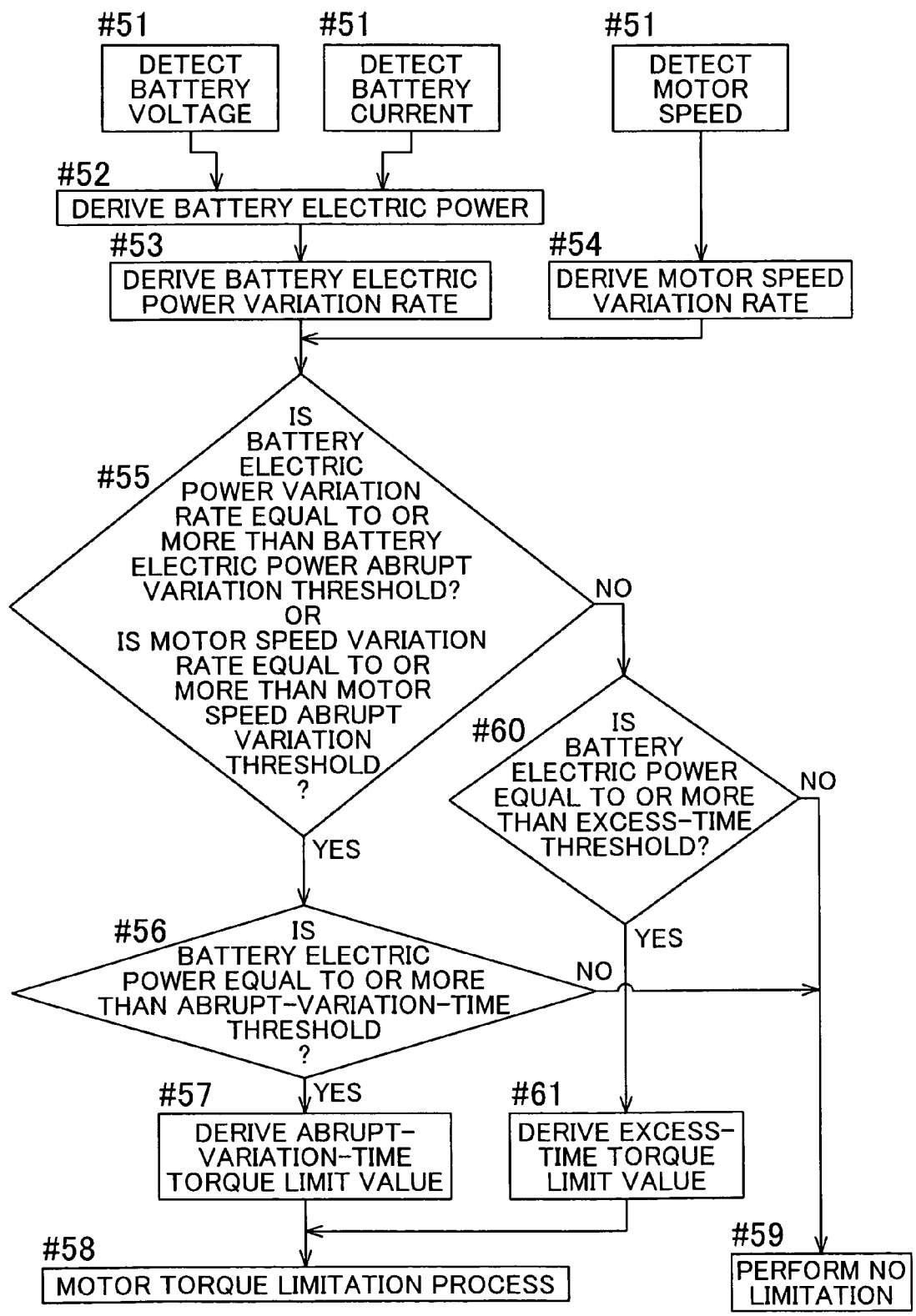
FIG. 12 shows the flow of a torque limitation process performed by the drive device shown in FIG. 11.

In the case where only a rotary electric machine serving as a motor is provided, the battery electric power may be calculated directly from the respective detection values of the battery current and the battery voltage as the product of the battery current and the battery voltage as shown in FIG. 12 described below. This is because in this case it is not necessary to take a rotary electric machine serving as a generator into consideration.

2. Battery Electric Power Variation Rate Calculation Unit

The battery electric power variation rate calculation unit 15b calculates the absolute value of the difference between the current battery electric power and the battery electric power a unit time step before as a battery electric power variation rate. Thus, the calculation is the same as that described earlier.

3. Rotational Speed Variation Rate Calculation Unit

The rotational speed variation rate calculation unit 15c calculates, for the rotary electric machine serving as a motor, the absolute value of the difference between the current rotational speed and the rotational speed a unit time step before as a rotational speed variation rate. Thus, the calculation is the same as that described earlier.

4. Torque Limitation Determination Unit

The torque limitation determination unit 15d is a unit for determining whether or not torque limitation is performed in the case where predetermined conditions unique to the present application are met.

Condition 1 (During Excess Time)

During an excess time when the battery electric power is higher than an excess-time threshold for determining whether or not the battery electric power is excessive as shown in the lowermost line of FIG. 5, the torque limitation unit executes torque limitation unconditionally.

During a non-excess time when the battery electric power is lower than the excess-time threshold, torque limitation is not executed except in the case of Condition 2 below.

Condition 2 (During Abrupt Variation Time)

During an abrupt variation time when the battery electric power is higher than an abrupt-variation-time threshold for determining whether or not the battery electric power is varying abruptly, the state of the battery electric power variation rate and the state of the motor speed variation rate are monitored, and in the case where either of the battery electric power variation rate and the motor speed variation rate is higher than a corresponding predetermined value as shown in the three upper lines of FIG. 5, the torque limitation unit executes torque limitation.

During a non-abrupt variation time when the battery electric power is lower than the abrupt-variation-time threshold, torque limitation is not executed except in the case of Condition 1 below.

Regarding the state of the battery electric power variation rate, the battery electric power is determined to be varying abruptly as considered on the basis of the battery electric power in the case where the battery electric power variation rate is higher than a battery electric power abrupt-variation-time threshold for determining whether or not the battery electric power variation rate is high.

Regarding the state of the rotational speed variation rate, the battery electric power is determined to be varying abruptly as considered on the basis of the rotational speed in the case where the rotational speed variation rate is higher than a rotational speed abrupt-variation-time threshold for determining whether or not the rotational speed variation rate is high. Thus, the calculation is the same as that described earlier.

In the case where torque limitation is executed as a result of the above determinations, the torque limit value calculation unit 15e operates to calculate a torque limit value at the time.

5. Torque Limit Value Calculation Unit

Excess-Time Torque Limit Value Calculation Unit

The excess-time torque limit value calculation unit 15f calculates, during an excess time, a torque limit value on the basis of excess-time limit electric power, which is a maximum value of the battery electric power that is allowed during the excess time. The excess-time limit electric power is substantially the same value as the excess-time threshold set in advance for the battery electric power described above.

Specifically, the excess-time torque limit value is calculated by Formula 13 below.

Excess-time torque limit value $[Nm]$=(excess-time limit electric power−motor loss)/$[(2\pi/60)\times$motor speed]　　Formula 13

Abrupt-Variation-Time Torque Limit Value Calculation Unit

The abrupt-variation-time torque limit value calculation unit 15g calculates, during an abrupt variation time, a torque limit value on the basis of abrupt-variation-time limit electric power, which is a maximum value of the battery electric power that is allowed during the abrupt variation time. The abrupt-variation-time limit electric power is substantially the same value as the abrupt-variation-time threshold set in advance for the battery electric power described above.

Specifically, the abrupt-variation-time torque limit value is calculated by Formula 14 below.

Abrupt-variation-time torque limit value [Nm]= (abrupt-variation-time limit electric power−motor loss)/[(2π/60)×motor speed]    Formula 14

The configuration of the rotary electric machine control system according to the present application has been described above.

The torque limitation performed by the rotary electric machine control system will be described below with reference to FIG. 12, which corresponds to FIG. 6.

FIG. 12 is a flowchart of a torque limitation process according to the embodiment.

The torque limitation process is repeated with a predetermined time step all through the period once an ignition key is turned on until it is turned off.

In the process, as shown in the uppermost line in the flowchart of FIG. 12, the battery voltage, the battery current, and the motor speed are detected (step #51).

After obtaining such information, the battery electric power calculation unit 15a derives the battery electric power at the time (step #52), and the battery electric power variation rate calculation unit 15b derives the variation rate of the battery electric power (step #53). Meanwhile, the rotational speed variation rate calculation unit 15c drives the rotational speed variation rate of the rotary electric machine serving as a motor from the sequentially read motor speed (step #54).

The torque limitation determination unit 15d determines on the basis of the battery electric power variation rate and the rotational speed variation rate obtained as described above whether or not any of the conditions that the battery electric power variation rate is equal to or more than the battery electric power abrupt-variation-time threshold and that the rotational speed variation rate is equal to or more than the rotational speed abrupt-variation-time threshold is met (step #55). In this way, it is determined as considered on the basis of the variation rates whether or not the battery electric power is varying abruptly. In the case where any of the conditions is met (step #55: yes), it is determined whether or not the battery electric power is equal to or higher than the abrupt-variation-time threshold (step #56). Thus, it is determined as considered on the basis of the magnitude of the battery electric power whether or not the battery electric power is varying abruptly.

In the case where it is determined that the battery electric power is varying abruptly (step #56: yes), the abrupt-variation-time torque limit value calculation unit 15g derives the abrupt-variation-time torque limit value (step #57), and motor torque limitation is executed on the basis of the calculated value (step #58). In the case where it is determined that the battery electric power is not varying abruptly (step #56: no), no limitation is performed (step #59), and the rotary electric machine serving as a motor is operated in accordance with the required torque and the required rotational speed.

In the case where any of the conditions is not met as from the battery electric power variation rate and the rotational speed variation rate (step #55: no), it is determined whether or not the battery electric power is equal to or higher than the excess-time threshold (step #60). Thus, it is determined as considered on the basis of the magnitude of the battery electric power whether or not the battery electric power is excessive.

In the case where it is determined that the battery electric power is excessive (step #60: yes), the excess-time torque limit value calculation unit 15f derives the excess-time torque limit value (step #61), and motor torque limitation is executed on the basis of the calculated value (step #58). In the case where it is determined that the battery electric power is not excessive (step #60: no), no limitation is performed (step #59), and the rotary electric machine serving as a motor is operated in accordance with the required torque and the required rotational speed.

By employing the configuration described above, it is possible to favorably prevent an over-current from flowing through a battery in a drive device including a single rotary electric machine serving as a motor.

(4) In the embodiment described above, current detection values are used to derive a torque limit value. However, in consideration of a sampling time or a control delay, it is also preferable that the torque limit value calculation unit derives a torque limit value employing a predicted value of the motor speed and a predicted value of the generator electric power. In this case, the motor speed predicted value and the generator electric power predicted value may be calculated on the basis of the following formulas.

Motor speed predicted value=current motor speed+ control delay×motor speed variation rate    Formula 21

Generator electric power predicted value=current generator electric power+control delay×generator electric power variation rate    Formula 22

In the case where such predicted values are employed, the excess-time torque limit value and the abrupt-variation-time torque limit value may be calculated on the basis of the following formulas in place of Formulas 5 and 6 cited above.

Excess-time torque limit value [Nm]=(excess-time limit electric power−generator electric power predicted value−motor loss−booster converter loss−capacitor charge electric power)/[(2π/60)× motor speed predicted value]    Formula 23

Abrupt-variation-time torque limit value [Nm]= (abrupt-variation-time limit electric power−generator electric power predicted value−motor loss−booster converter loss−capacitor charge electric power)/[(2π/60)×motor speed predicted value]    Formula 24

It is possible to perform control with higher accuracy by using such predicted values.

It is possible to provide a rotary electric machine control system for a rotary electric machine that is supplied with electric power from a battery via an inverter to serve as a motor, in which a circuit from the battery to the inverter is reliably protected by preventing an over-current. Also, it is possible to provide a rotary electric machine control system for a hybrid system including a pair of rotary electric machines that are supplied with electric power from a common battery to respectively serve as a generator and a motor, in which a circuit from the battery to an inverter is reliably protected by preventing an over-current.

The invention claimed is:

1. A rotary electric machine control system including a rotary electric machine and an inverter interposed between a battery and the rotary electric machine to control a current that flows through the rotary electric machine, comprising:

a battery electric power calculation unit for calculating battery electric power that is supplied from the battery;

a torque limitation unit for limiting an output torque of the rotary electric machine; and a battery electric power abrupt variation estimation unit for estimating that the battery electric power is in an abrupt variation state in which the battery electric power is varying abruptly on the basis of at least one of a battery electric power variation rate being equal to or more than a battery electric power abrupt variation threshold and a rotary electric machine speed variation rate being equal to or more than a rotary electric machine speed abrupt variation threshold, wherein the torque limitation unit changes, in the case where the battery electric power abrupt variation estimation unit estimates that the battery electric power is in the abrupt variation state, a mode of limitation of the output torque from a mode of limitation of the output torque used in a non-abrupt variation state in which the battery electric power is not varying abruptly.

2. The rotary electric machine control system according to claim 1, wherein the torque limitation unit executes torque limitation in the non-abrupt variation state in which the battery electric power is not varying abruptly and during an excess time when the battery electric power calculated by the battery electric power calculation unit is higher than an excess-time threshold for determining whether or not the battery electric power is excessive, and the torque limitation unit executes torque limitation in the abrupt variation state in which the battery electric power is varying abruptly and during an abrupt variation time when the battery electric power is higher than an abrupt-variation-time threshold that is smaller than the excess-time threshold.

3. The rotary electric machine control system according to claim 1, wherein the battery electric power abrupt variation estimation unit estimates that the battery electric power is varying abruptly in the case where the battery electric power is higher than a battery electric power abrupt-variation-time threshold on the basis of which it is determined whether or not the battery electric power variation rate is high, or in the case where the rotary electric machine speed variation rate is higher than a rotational speed abrupt-variation-time threshold on the basis of which it is determined whether or not the rotary electric machine speed variation rate is high.

4. The rotary electric machine control system according to claim 3, wherein the battery electric power calculation unit derives the battery electric power on the basis of an actual rotational speed of the rotary electric machine and a required torque required of the rotary electric machine.

5. The rotary electric machine control system according to claim 2, further comprising:

an excess-time torque limit value calculation unit for calculating, in the case where the torque limitation unit executes torque limitation during the excess time, a torque limit value on the basis of excess-time limit electric power which is a maximum value of the battery electric power that is allowed during the excess time.

6. The rotary electric machine control system according to claim 5, further comprising:

an abrupt-variation-time torque limit value calculation unit for calculating, in the case where the torque limitation unit executes torque limitation during the abrupt varia-tion time, a torque limit value on the basis of abrupt-variation-time limit electric power which is a maximum value of the battery electric power that is allowed during the abrupt variation time.

7. The rotary electric machine control system according to claim 2, further comprising:

an excess-time torque limit value calculation unit for calculating, in the case where the torque limitation unit executes torque limitation during the excess time, a torque limit value on the basis of excess-time limit electric power which is a maximum value of the battery electric power that is allowed during the excess time; and an abrupt-variation-time torque limit value calculation unit for calculating, in the case where the torque limitation unit executes torque limitation during the abrupt variation time, a torque limit value on the basis of abrupt-variation-time limit electric power which is a maximum value of the battery electric power that is allowed during the abrupt variation time, wherein the excess-time limit electric power is higher than the abrupt-variation-time limit electric power.

8. The rotary electric machine control system according to claim 7, wherein only the rotary electric machine serving as a motor is to be controlled, and the torque limit value is calculated on the basis of limit electric power which is a maximum value of the battery electric power that is allowed and a motor loss required by the rotary electric machine to serve as a motor.

9. The rotary electric machine control system according to claim 7, wherein a first rotary electric machine serving as a generator and a second rotary electric machine serving as a motor are to be controlled, and the torque limit value is calculated on the basis of limit electric power which is a maximum value of the battery electric power that is allowed, electric power required by the second rotary electric machine to serve as a motor, and electric power required by the first rotary electric machine to serve as a generator.

10. The rotary electric machine control system according to claim 7, wherein the torque limit value is calculated on the basis of a motor speed predicted value obtained as a sum of a product of a variation rate of a motor speed and a coefficient based on a control delay and a current motor speed.

11. The rotary electric machine control system according to claim 10, wherein the torque limit value is calculated on the basis of a generator estimated electric power predicted value obtained as a sum of a product of a variation rate of generator electric power and a coefficient based on a control delay and current generator electric power.

12. A rotary electric machine control system including a rotary electric machine and an inverter interposed between a battery and the rotary electric machine to control a current that flows through the rotary electric machine, comprising:

a battery electric power calculation unit for calculating battery electric power that is supplied from the battery;

a torque limitation unit for limiting an output torque of the rotary electric machine; and a battery electric power abrupt variation estimation unit for estimating that the battery electric power is in an abrupt variation state in which the battery electric power is varying abruptly on the basis of a variation rate of a rotational speed of the rotary electric machine, wherein the torque limitation unit changes, in the case where the battery electric power abrupt variation estimation unit estimates that the battery electric power is in the abrupt variation state, a mode of limitation of the output torque from a mode of limitation of the output torque used in a non-abrupt variation state in which the battery electric power is not varying abruptly.

13. The rotary electric machine control system according to claim 12, wherein
the torque limitation unit executes torque limitation in the non-abrupt variation state in which the battery electric power is not varying abruptly and during an excess time when the battery electric power calculated by the battery electric power calculation unit is higher than an excess-time threshold for determining whether or not the battery electric power is excessive, and
the torque limitation unit executes torque limitation in the abrupt variation state in which the battery electric power is varying abruptly and during an abrupt variation time when the battery electric power is higher than an abrupt-variation-time threshold that is smaller than the excess-time threshold.

14. The rotary electric machine control system according to claim 12, wherein
the battery electric power abrupt variation estimation unit estimates that the battery electric power is varying abruptly in the case where the variation rate of the rotational speed of the rotary electric machine is higher than a rotational speed abrupt-variation-time threshold on the basis of which it is determined whether or not the variation rate of the rotational speed of the rotary electric machine is high.

* * * * *